(12) United States Patent
Nam et al.

(10) Patent No.: US 8,213,265 B2
(45) Date of Patent: Jul. 3, 2012

(54) METHOD OF OBJECT TRACKING IN 3D SPACE BASED ON PARTICLE FILTER USING ACOUSTIC SENSORS

(75) Inventors: Yun Young Nam, Suwon-si (KR); Jin Seok Lee, Suwon-si (KR); Sang Jin Hong, New York, NY (US); We Duck Cho, Seongnam-si (KR)

(73) Assignee: Ajou University Industry Cooperation Foundation, Gyeonggi-do (KR)

( * ) Notice: Subject to any disclaimer, the term of this patent is extended or adjusted under 35 U.S.C. 154(b) by 0 days.

(21) Appl. No.: 12/918,607

(22) PCT Filed: Apr. 4, 2008

(86) PCT No.: PCT/KR2008/001916
§ 371 (c)(1),
(2), (4) Date: Aug. 20, 2010

(87) PCT Pub. No.: WO2009/107895
PCT Pub. Date: Sep. 3, 2009

(65) Prior Publication Data
US 2010/0316233 A1    Dec. 16, 2010

(30) Foreign Application Priority Data
Feb. 27, 2008  (KR) .......................... 10-2008-0017936

(51) Int. Cl.
*G01S 3/80* (2006.01)
(52) U.S. Cl. .......................... 367/129; 367/124; 367/118
(58) Field of Classification Search .................. 367/118, 367/124, 129
See application file for complete search history.

(56) References Cited

U.S. PATENT DOCUMENTS

| | | | |
|---|---|---|---|
| 3,940,769 A | 2/1976 | Sherman et al. | 343/113 |
| 4,223,311 A | 9/1980 | Ellingson | 343/112 D |
| 4,480,322 A | 10/1984 | Orieux et al. | 367/123 |
| 7,206,421 B1 | 4/2007 | Taenzer | 381/119 |

OTHER PUBLICATIONS

Sheng et al., "Sequential Acoustic Energy based Source Localization using Particle Filter in a Distributed Sensor Network," ICASSP 2004, pp. 972-975.*
Cho et al, "Passive Sensor based Dynamic Object association with particle filtering," Advance Video and Signal based Surveillance, IEEE conference on AVSS 2007, Sep. 2007, pp. 206-211.*
Lee et al, "Multitarget Association and Tracking in 3D space based on Particle Filter with Joint Multitarget Probability Density," Advance Video and Signal based Surveillance, IEEE conference on AVSS 2007, Sep. 2007, pp. 573-578.*
International Search Report in PCT/KR2008/001916 dated Nov. 25, 2008.
Stanacevic et al. (2003), "Micropower Gradient Flow Acoustic Localizer", *Solid-State Circuit Conf.* (*ESSCIRC03*), 69-72.

* cited by examiner

*Primary Examiner* — Ian Lobo
(74) *Attorney, Agent, or Firm* — Harness, Dickey & Pierce, P.L.C.; Anthony G. Fussner; Kisuk Lee

(57) ABSTRACT

There is provided a method of tracking an object in a three-dimensional (3-D) space by using particle filter-based acoustic sensors, the method comprising selecting two planes in the 3-D space; executing two-dimensional (2-D) particle filtering on the two selected planes, respectively; and associating results of the 2-D particle filtering on the respective planes.

10 Claims, 36 Drawing Sheets

(a) $\phi : 10°, 20°, 30°, 45°$ (b) $\phi : 60°, 70°, 80°$ (c) $\phi : 100°, 110°, 120°, 135°$ (a) $\phi : 10°, 20°, 30°, 45°$ (b) $\phi : 60°, 70°, 80°$ (c) $\phi : 100°, 110°, 120°, 135°$ (d) $\phi : 150°, 160°, 170°$ (a) CRLB X (b) CRLB Y (c) CRLB Z (a) CRLB X (c) CRLB Z (a) CRLB X (b) CRLB Y (c) CRLB Z (d) Enlargement of A section (e) Enlargement of B section (f) Enlargement of C section (a) CRLB X (b) CRLB Y (c) CRLB Z

METHOD OF OBJECT TRACKING IN 3D SPACE BASED ON PARTICLE FILTER USING ACOUSTIC SENSORS

CROSS-REFERENCE TO RELATED APPLICATIONS

This application is a national phase of PCT Application No. PCT/KR2008/001916 filed on Apr. 4, 2008, which claims the benefit and priority to Korean Patent Application No. 10-2008-0017936 filed Feb. 27, 2008. The entire disclosures of the applications identified in this paragraph are incorporated herein by references.

TECHNICAL FIELD

The present invention relates to a method of tracking an object in a three-dimensional space by using a particle filter including passive acoustic sensors, and more particularly, to a method of tracking an object in a three-dimensional space, which is capable of reducing complexity of calculation simultaneously with accurately executing three-dimensional object tracking by decomposing a three-dimensional particle filter into simple two-dimensional particle is filters instead of directly extending a conventional particle filtering algorithm for bearings-only tracking to a three-dimensional space.

BACKGROUND ART

Locating and tracking an object using passive sensors both indoor and outdoor have been great interests in numerous applications. For tracking an object with passive sensors, several approaches, based on time-delay estimation (TDE) methods and beamforming methods, have been proposed. The TDE method estimates location based on the time delay of arrival of signals at the receivers [1]. The beamforming method uses the frequency-averaged output power of a steered beamformer. The TDE method and beamforming method attempt to determine the current source location using data obtained at the current time only.

Each method transforms the acoustic data into a function which represents a peak in the location corresponding to the source in a deterministic way.

However, the estimation accuracy of these methods is sensitive to the noise-corrupted signals. In order to overcome the drawback of the methods, a state-space driven approach based on particle filtering was applied and proposed. The particle filtering is an emerging powerful tool for sequential signal processing, especially for nonlinear and non-Gaussian problems. The previous work on tracking with particle filters was formulated for the source localization. It presented the framework with revised TDE-based or beamforming methods using particle filtering, and the sensors are positioned at specified location at a constant height to estimate an object's trajectory in two dimensional (2-D) space. However, in those methods, the extension to three dimensional space is quite difficult and inflexible. More than the number of positioned microphones are required for generating another 2-D plane in order to extend to 3-D. In addition, mobility of the sensors cannot be supported due to their fixed position. In order to overcome the mobility problem, Direction of Arrival (DOA) based bearings-only tracking has been widely used in many applications.

In this paper, we analyze the tracking methods based on passive sensors for the flexible and accurate 3-D tracking. Tracking in 3-D has been addressed by directly extending 2-D bearings-only tracking problem to 3-D problem. Instead of directly extending traditional particle filtering algorithms for bearings-only tracking for 3-D space, we propose to decompose the 3-D particle filter into several simpler particle filters designed for 2-D bearings-only tracking problems. The decomposition and selection for the 2-D particle filters are based on the characterization of the acoustic sensor operation under noisy environment. As the passive acoustic localizer model, there is used a passive acoustic localizer proposed in M. Stanacevic, G. Cauwenberghs, "Micropower Gradient Flow acoustic Localizer," in *Solid-State Circuits Conf.* (*ESS-CIRC*03), pp. 69-72, 2003. The acoustic localizer detects two angle components (azimuth angle $\theta$, elevation angle $\phi$) between a sensor and an object. We extend the approach to multiple particle filter fusion for robust performance. We compare the proposed approach with the directly extended bearings-only tracking method using Cramer-Rao Low Bound.

DETAILED DESCRIPTION OF THE INVENTION

Technical Problem

The present invention provides a method of tracking an object in a three-dimensional space by using particle filter-based acoustic sensors capable of increasing accuracy while reducing complexity of calculation.

Technical Solution

According to an aspect of the present invention, there is provided a method of tracking an object in a three-dimensional (3-D) space by using particle filter-based acoustic sensors, the method including: selecting two planes in the 3-D space; executing two-dimensional (2-D) particle filtering on the two selected planes, respectively; and associating results of the 2-D particle filtering on the respective planes.

Preferably, in the selecting two planes, the two planes may be selected from planes in a 3-D space formed by a single sensor. In this case, the two selected planes may be determined based an elevation of three planes in the 3-D space with respect to the single sensor.

On the other hand, in the selecting two planes, the two planes may be selected from planes in a 3-D space formed by each of a plurality of sensors. In this case, the two selected planes may be determined based on an azimuth and an elevation of the planes in the 3-D space with respect to the each of the plurality of sensors.

Preferably, the selecting two planes may be executed by using independent is k-multiple sensors. On the other hand, the selecting two planes may be executed by using common-resampling k-multiple sensors. On the other hand, the selecting two planes may be executed by using one merged k-multiple sensors.

Preferably, the associating results of the 2-D particle filtering on the respective planes, may be performed regarding weights as the same with respect to the same factors in two different planes. On the other hand, in the associating results of the 2-D particle filtering on the respective planes may be performed by adding a weight of each of the same factors in two different planes to each other.

Advantageous Effects

There is a merit of accurately tracking an object in a three-dimensional space while reducing complexity of calculation by decomposing a three-dimensional particle filter into various simple two-dimensional particle filters in a method of tracking an object in a three-dimensional space by using particle filter-based acoustic sensors according to an embodiment of the present invention.

BEST MODE FOR CARRYING OUT THE INVENTION

Figure 1:
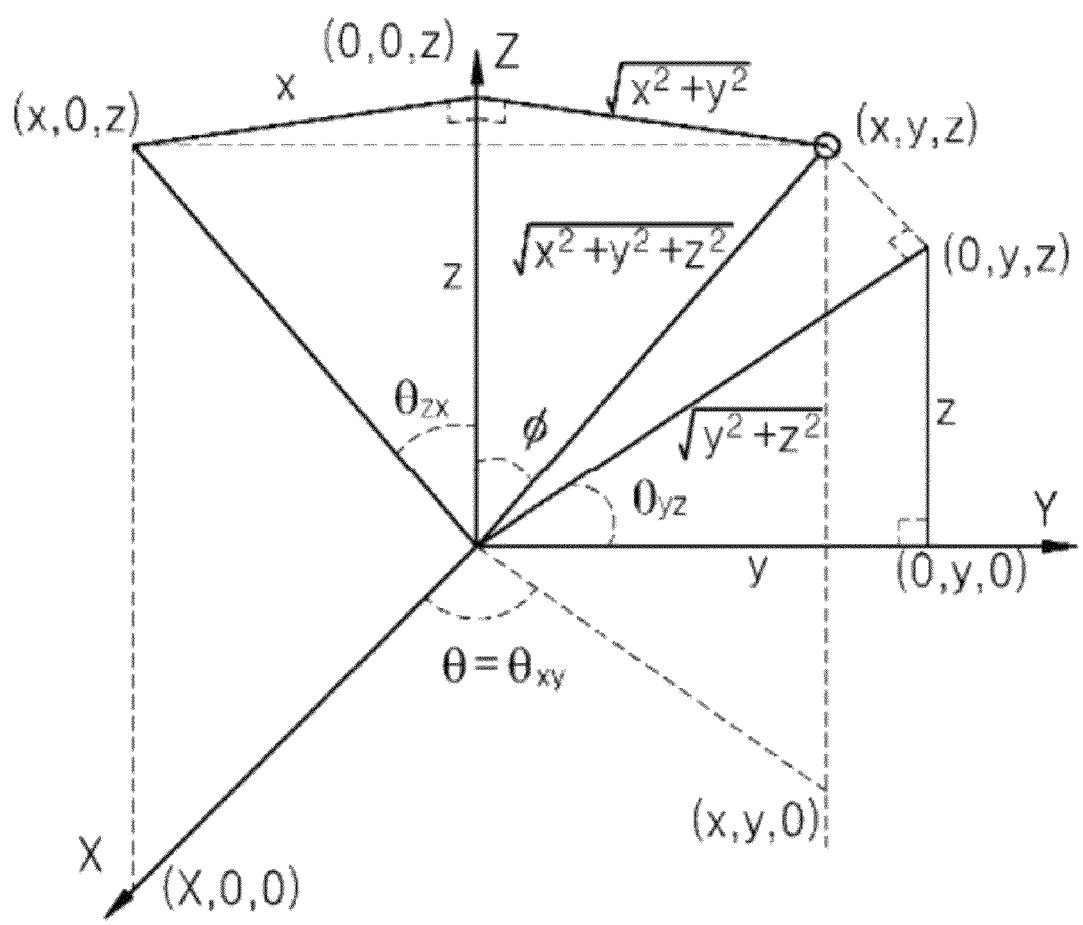
FIG. 1 illustrates conversion of originally measured angles.
Figure 2A:
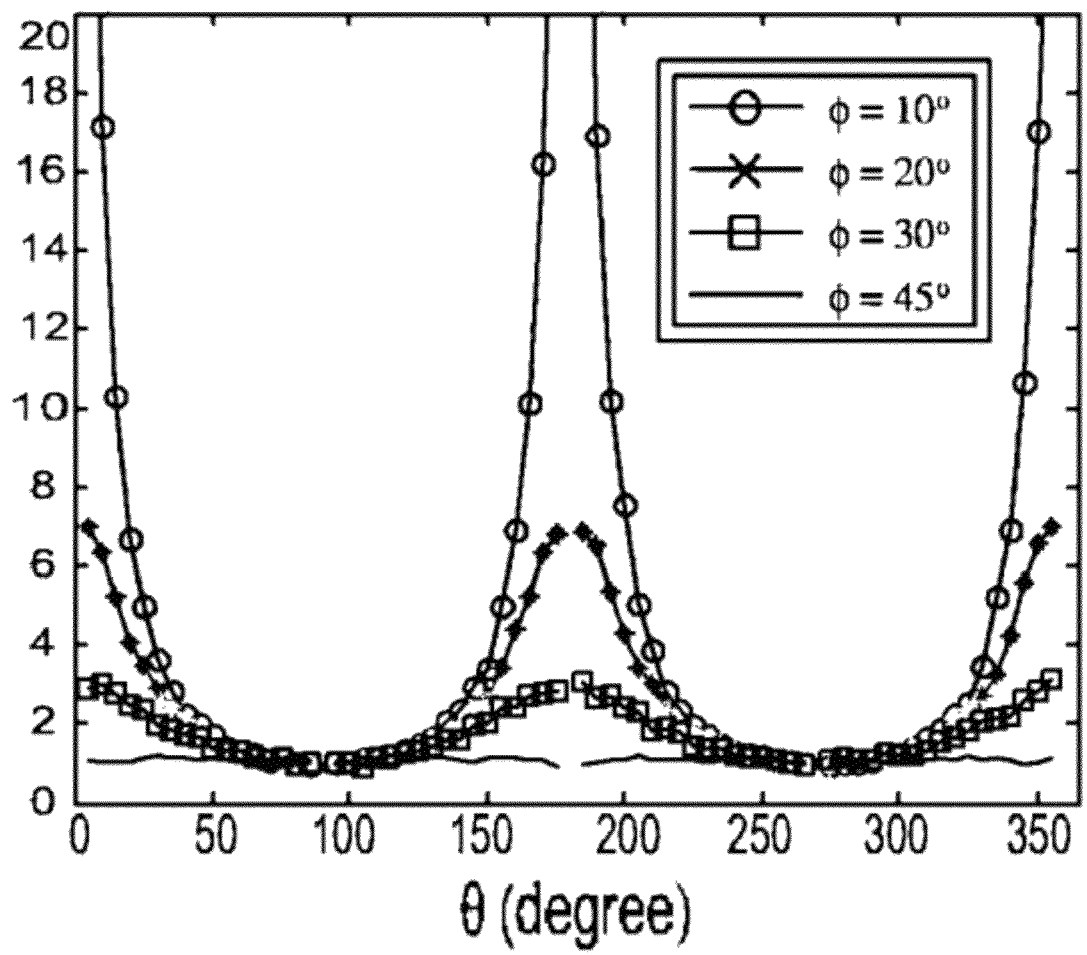
FIGS. 2(a)-(d) and 3(a)-(d) illustrate angle variances in projected yz and zx planes, respectively.
Figure 2B:
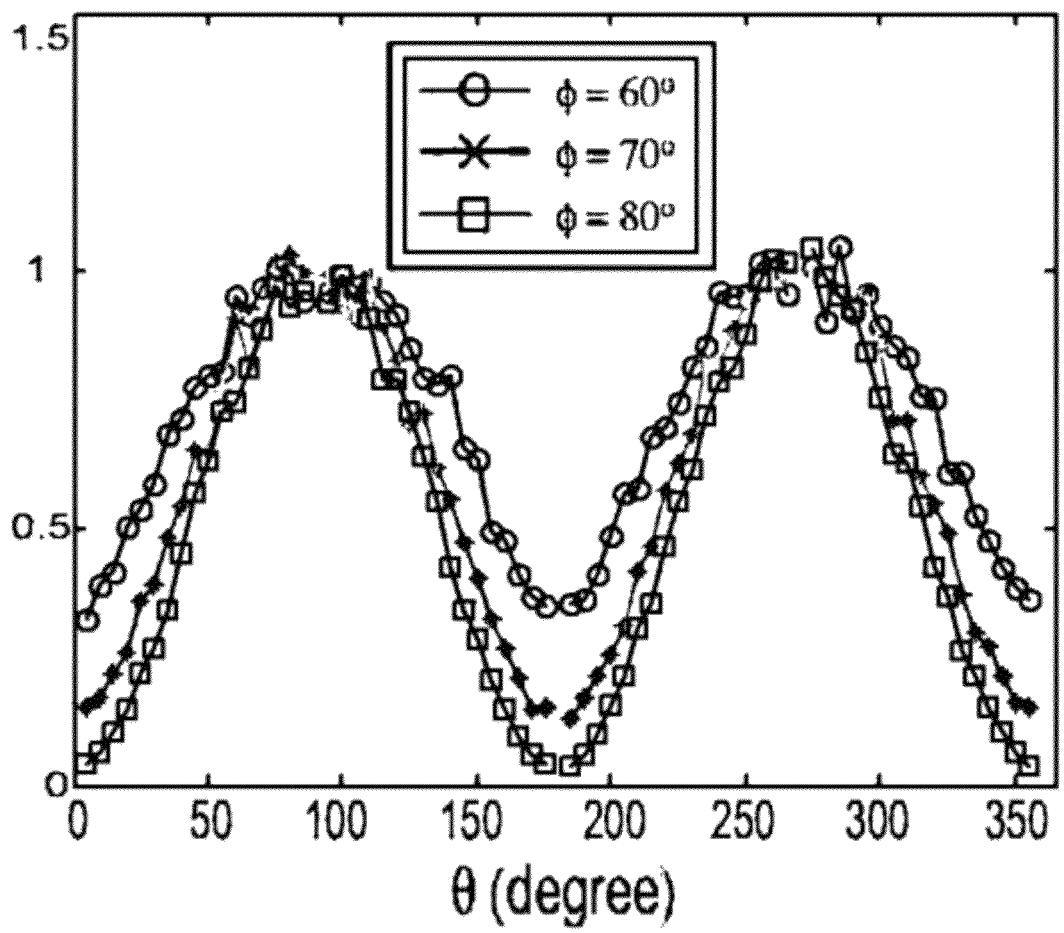
Figure 2C:
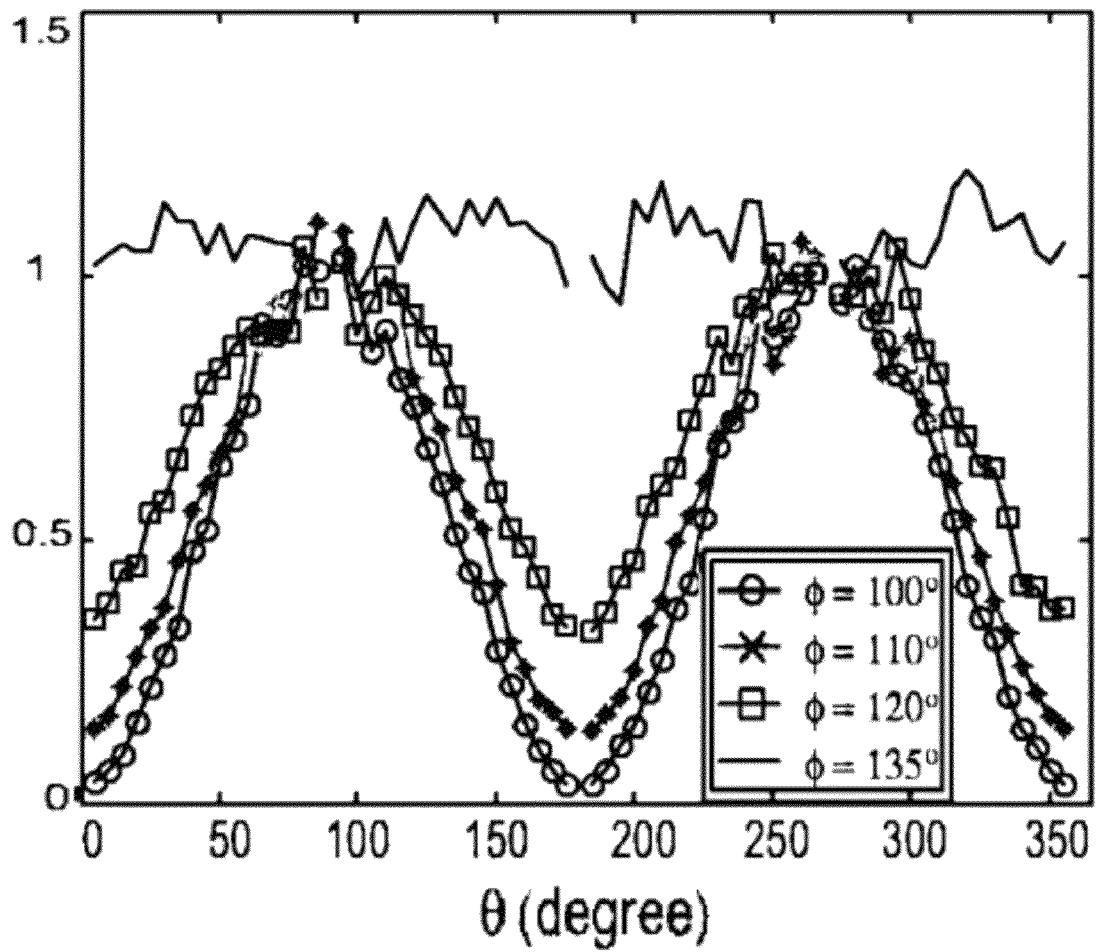
Figure 2D:
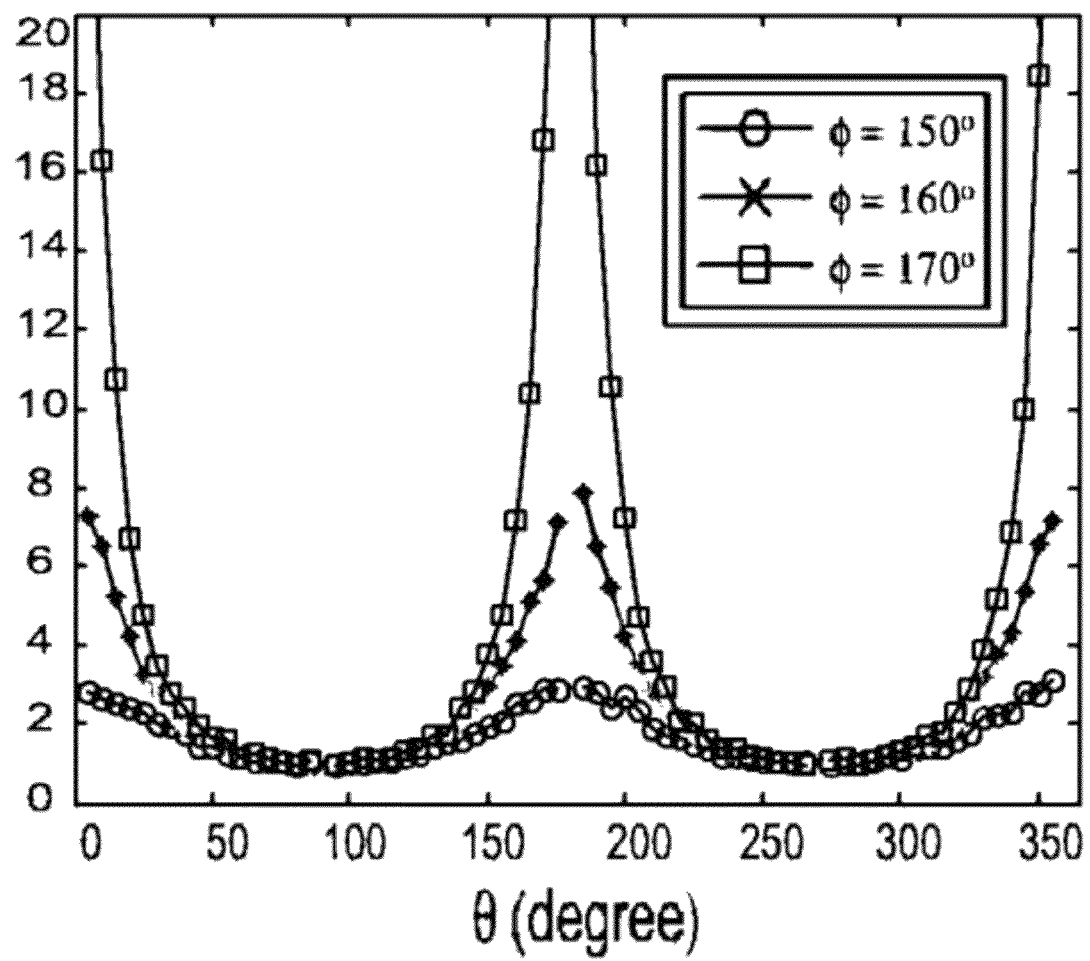
Figure 3A:
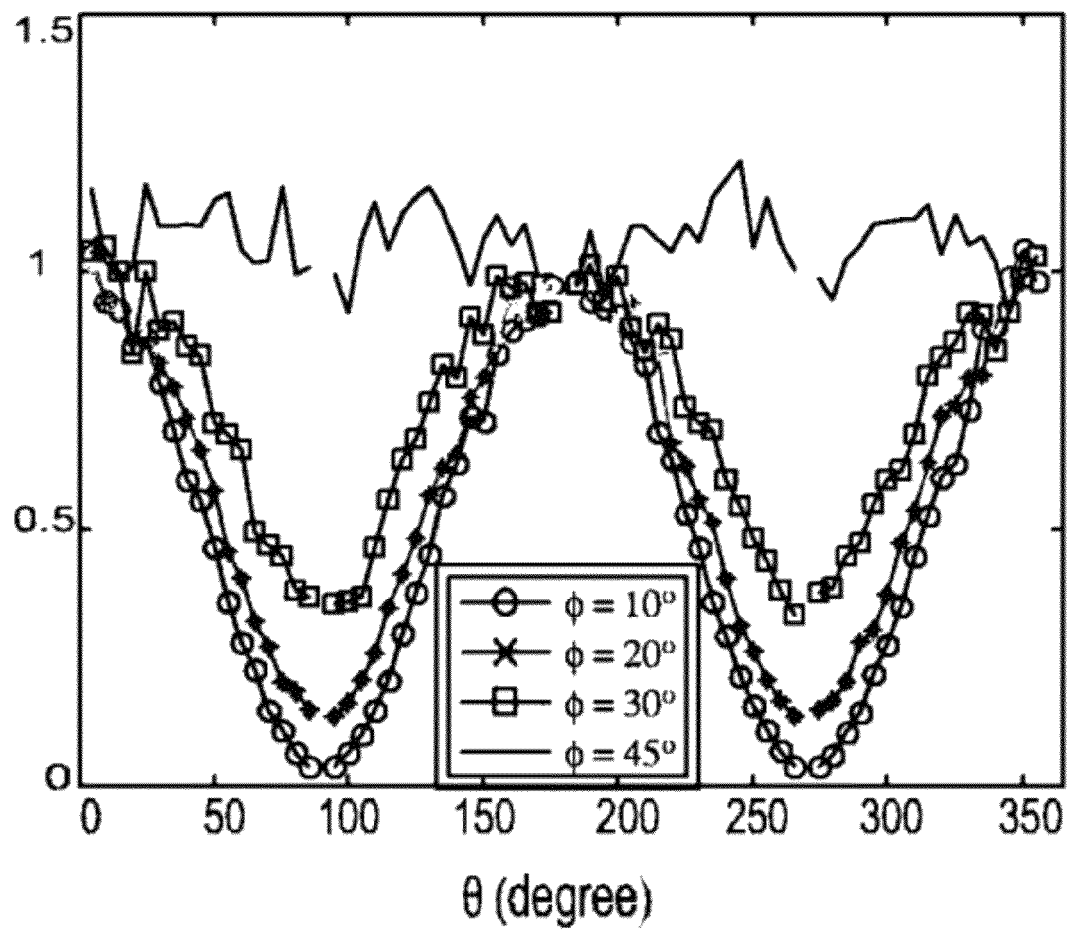
Figure 3B:
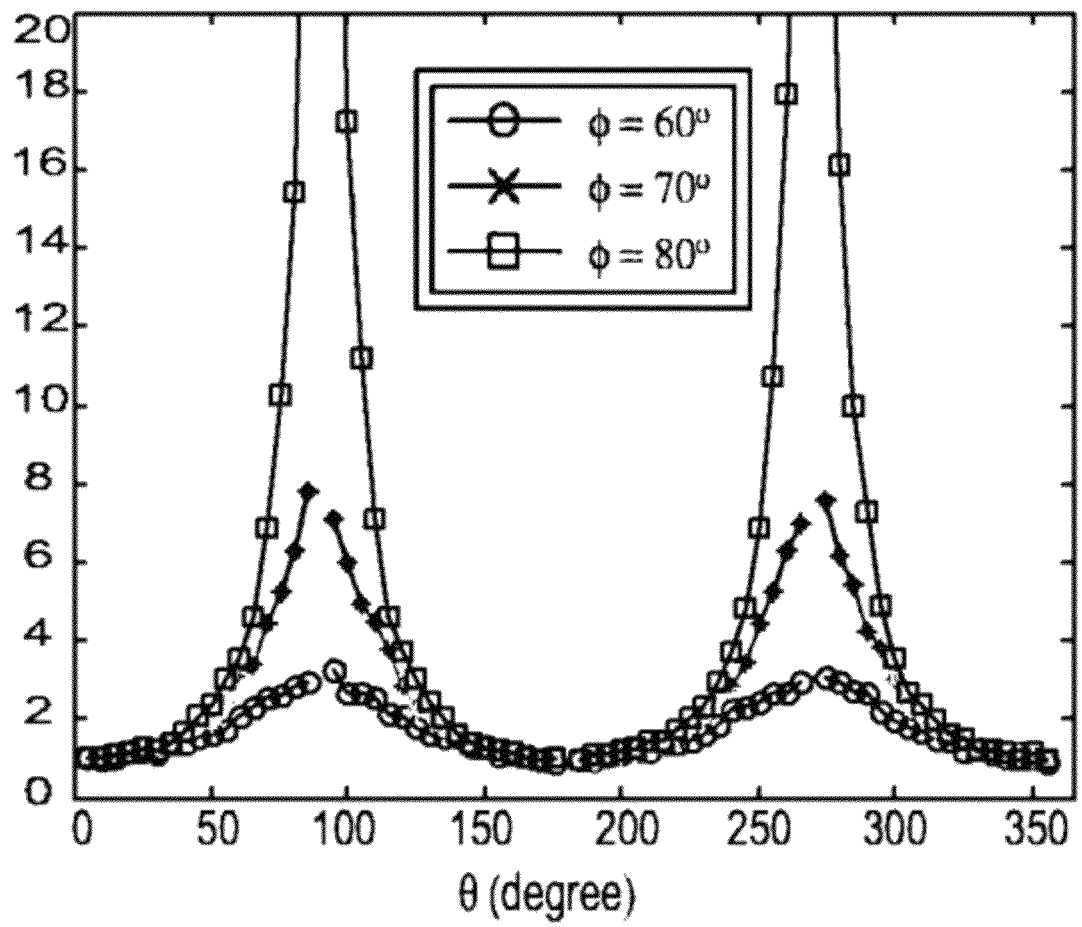
Figure 3C:
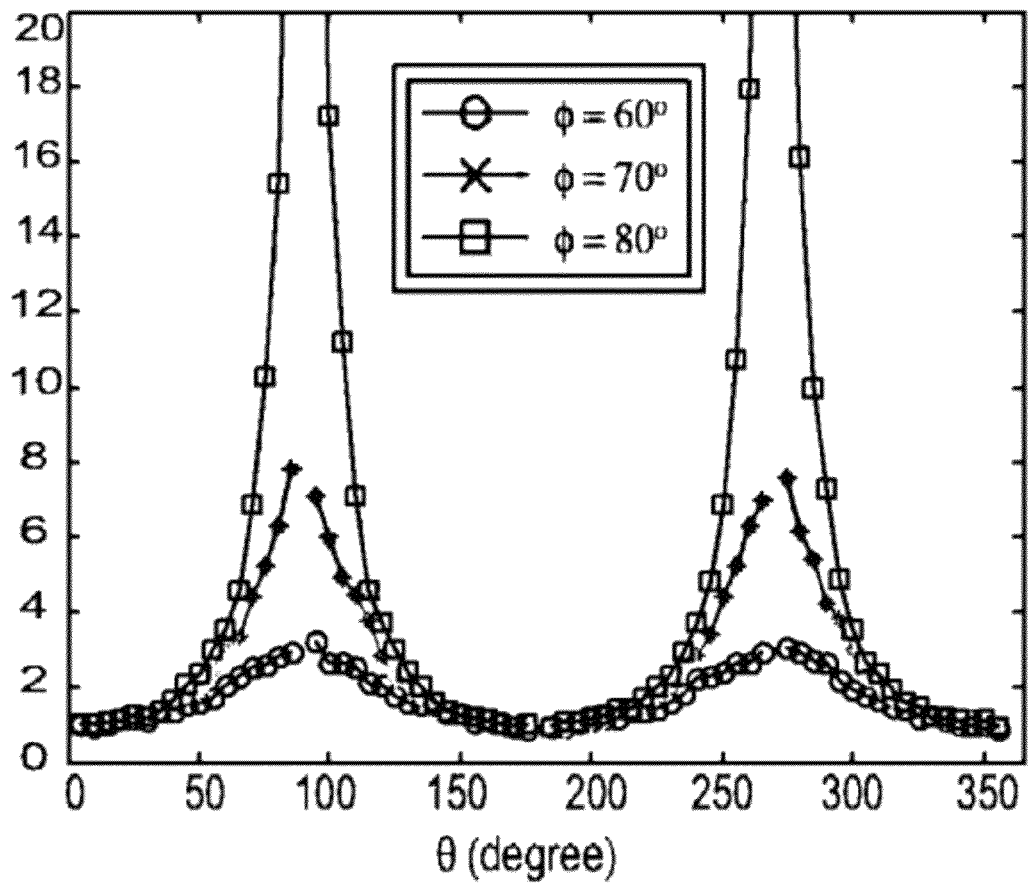
Figure 3D:
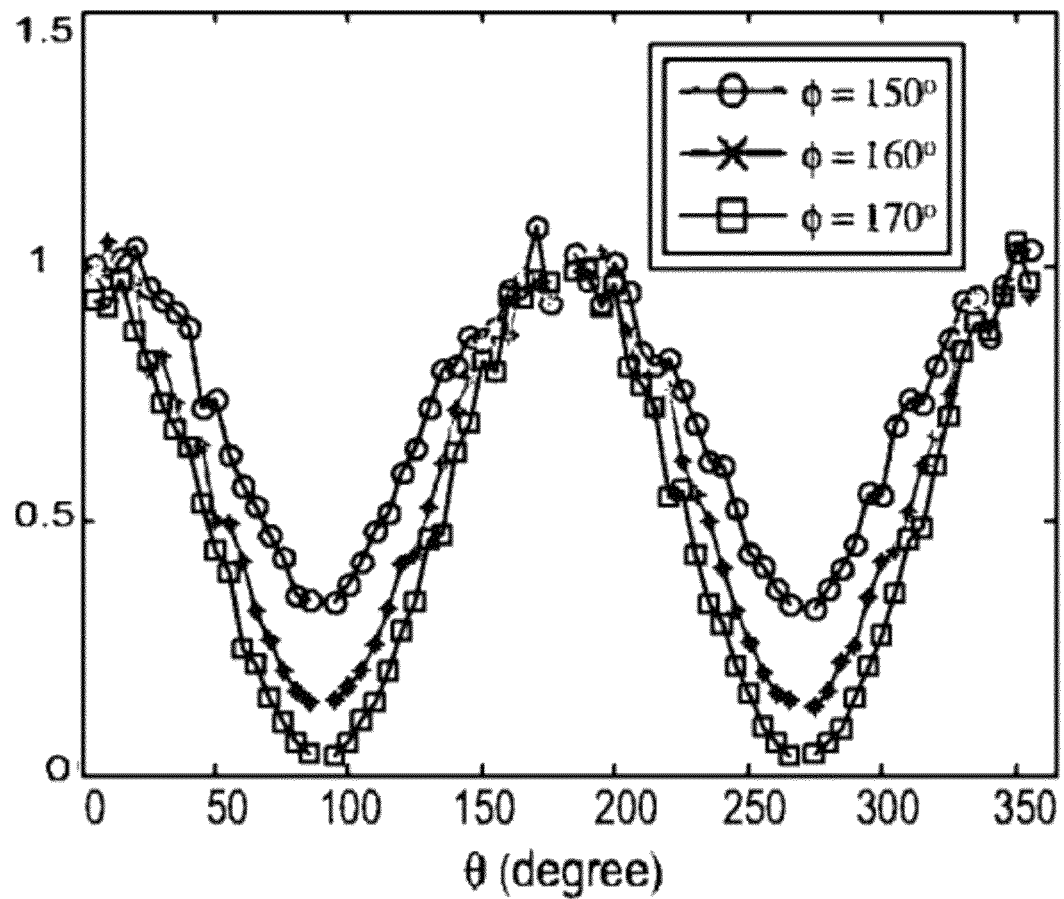

To fully understand advantages of operations of the present invention and the objects obtained by embodiments of the present invention, it is required to refer to attached drawings illustrating preferable embodiments of the present invention and contents shown in the drawings. Hereinafter, the preferable embodiments of the present invention will be described in detail with reference to the attached is drawings. The same reference numerals shown in each drawing indicate the same elements.

A three dimensional localizer model and its implementation is described in M. Stanacevic, G. Cauwenberghs, "Micropower Gradient Flow acoustic Localizer," in *Solid-State Circuits Conf.* (*ESSCIRC*03), pp. 69-72, 2003. The localizer is based on gradient flow to determine the Direction of Arrival (DOA) of the acoustic source.

FIG. 1 illustrates the angle conversion process. Based on the measured two angles, azimuth θ and elevation φ, ($0 \leq \theta \leq 2\pi$, $2 \leq \phi \leq \pi$), from the acoustic localizer, three angles for two dimension (2-D) planes are derived: $\theta_{xy}$, $\theta_{yz}$, $\theta_{zx}$. Each of these three angles is used for a 2-D tracking using particle filter. For example, $\theta_{xy}$ is used in xy plane, $\theta_{yz}$ and and $\theta_{zx}$ are used in yz plane and zx plane, respectively. The angles are defined as $$\theta_{xy} = \theta \quad (1)$$
$$\theta_{yz} = \tan^{-1}\left(\frac{|\sec\theta|}{\tan\theta\tan\phi}\right) + \beta$$
$$\theta_{zx} = \tan^{-1}\left(\frac{\tan\phi}{|\sec\theta|}\right) + \gamma$$

where β=0 for (y≧0, z≧0), β=π for (y<0), β=2π for (y≧0, z<0), γ=0 for (z≧0, x≧0), γ=π for (x<0), γ=2π for (z≧0, x<0).

For simplicity, we assume the variances $\sigma(\theta)^2$ and $\sigma(\phi)^2$ of the originally measured angles θ and φ are identically measured and denoted as $\sigma^2$. The noise-corrupted measurements θ and φ with variance $\sigma^2$ are conveyed to the projected plane angles $\theta_{xy}$, $\theta_{yz}$ and $\theta_{zx}$ with variances $\sigma_{xy}^2$, $\sigma_{yz}^2$, and $\sigma_{zx}^2$ as $$\theta_{xy,n} = \dot\theta_{xy,n} + E_n^{xy},$$
$$\theta_{yz,n} = \dot\theta_{yz,n} + E_n^{yz}$$
$$\theta_{zx,n} = \dot\theta_{zx,n} + E_n^{zx} \quad (2)$$

where $\dot\theta_{p,n}$ is a true angle in p plane: x-y, y-z or z-x plane. $E_n^p$ is projected noise with variance $\sigma_p^2$ in p plane. Note that the original variance $\sigma^2$ is individually represented as $\sigma_{xy}^2$, $\sigma_{yx}^2$, $\sigma_{zx}^2$ through the projection.

Each projected measurement variance is derived from (1). However, it is difficult to express the mathematical derivation which requires variances product and the variance of nonlinear function. In addition, the mathematical derivation is only an approximated solution. FIG. 2 and FIG. 3 represent projected angle variances in y-z and z-x planes, which are obtained empirically with 10,000 trials. FIGS. 2 and 3 illustrate the projected angle variances $\sigma_{xy}^2$, and $\sigma_{zx}^2$ when $\sigma^2$ of θ and φ are both 1. Note that the projected angle $\theta_{xy}$ in x-y plane is the same as the original θ; thus, $\sigma_{xy}^2$ is the same as $\sigma^2$.

The projected variances in y-z and z-x planes change as θ and φ change. In y-z plane, φ in the range between 45± and 135± results in less variance than the original measurement variances of 1. In addition, as θ approaches to 0± or 180±, the variance decreases further. On the other hand, in z-x plane, the other range of φ and θ result in less variance than the original measurement variances. Through the projected measurement variance, we approach an object tracking to method in a 3-D space.

There will be described formulation for three-dimensional space estimation.

Consider an object state vector $X_n$, which evolves according to $$X_n = f_{n-1}(X_{n-1}) + Q_{n-1} \quad (3)$$

where fn is a nonlinear, state transition function of the state $X_n$, and $Q_{n-1}$ is the non-Gaussian noise process in the time-instant interval between n and n−1. The measurements of the evolving object state vector is expressed as $$Z_n = h_n(X_n) + E_n \quad (4)$$

where $h_n$ is a nonlinear and time-varying function of the object state, $E_n$ is the measurement error referred to as a measurement noise sequence which is independent identically distributed (IID) white noise process. Then, the prediction probability density function (pdf) is obtained as $$p(X_n|Z_{1:n-1}) = \int p(X_n|X_{n-1})p(X_{n-1}|Z_{1:n-1})dX_{n-1} \quad (5)$$

where $Z_{1:n}$ represents the sequence of measurements up to time instant n, and p(Xn|Xn−1) is the state transition density with Markov process of order one related to $f_n(\cdot)$ and $Q_{n-1}$ in (3). Note that $p(X_{n-1}|Z_{1:n-1})$ is obtained from the previous time-instant n−1, recursively.

For the next time-instant estimation based on Bayes' rule, the posterior pdf involving prediction pdf is obtained as $$p(X_n \mid Z_{1:n}) = \frac{p(Z_n \mid X_n)p(X_n \mid Z_{1:n-1})}{\int p(Z_n \mid X_n)p(X_n \mid Z_{1:n-1})dX_n} \quad (6)$$

where $p(Z_n|X_n)$ is the likelihood or measurement density in (4) related to measurement model $h_n(\cdot)$ and noise process En, and the denominator is the normalizing constant. In other words, the measurement Zn is used to modify the prior density (5) to obtain the current posterior density (6).

For the consistent denotation of variables, the projected plane angle measurements $\theta_{xy}$, $\theta_{yz}$, $\theta_{zx}$ at time-instant n are denoted as $Z_n(xy)$, $Z_n(yz)$, $Z_n(zx)$, and object state vectors in 2-D planes $(X_n(xy), X_n(yz), X_n(zx))$ and 3-D space $(X_n)$ are defined as $$X_n = [X_n Vx_n y_n Vy_n z_n Vz_n] \quad (7)$$

$$X_n(xy) = [x_n(xy) Vx_n(xy) y_n(xy) Vy_n(xy)] \quad (8)$$

$$X_n(yz) = [y_n(yz) Vy_n(yz) z_n(yz) Vz_n(yz)] \quad (9)$$

$$X_n(zx) = [z_n(zx) Vz_n(zx) x_n(zx) Vx_n(zx)] \quad (10)$$

where $\{x_n, y_n, z_n\}$ and $\{Vx_n, Vy_n, Vz_n\}$ are the true source location and velocity in 3-D Cartesian coordinates, respectively. $[x_n(xy), y_n(xy)]$ and $[Vx_n(xy), Vy_n(xy)]$ are the projected true source location and velocity on a x-y plane; y-z and z-x planes are applied in the same way. Note that $x_n$, $x_n(xy)$ and $x_n(zx)$ are all different since $x_n(xy)$ and $x_n(zx)$ are estimated independently, and xn is the final fused value based on $x_n(xy)$ and $x_n(zx)$; the rest of components are applied similarly. Then, the three posterior pdf involving prediction probability density functions $p(X_n(xy)|Z_{1:n}(xy))$, $p(X_n(yz)|Z_{1:n}(yz))$ and $p(X_n(zx)|Z_{1:n}(zx))$ are given as $$\frac{p(Z_n(xy) \mid X_n(xy))p(X_n(xy) \mid Z_{1:n-1}(xy))}{\int p(Z_n(xy) \mid X_n(xy))p(X_n(xy) \mid Z_{1:n-1}(xy))dX_n(xy)} \quad (11)$$

$$\frac{p(Z_n(yz) \mid X_n(yz))p(X_n(yz) \mid Z_{1:n-1}(yz))}{\int p(Z_n(yz) \mid X_n(yz))p(X_n(yz) \mid Z_{1:n-1}(yz))dX_n(yz)} \quad (12)$$

$$\frac{p(Z_n(zx) \mid X_n(zx))p(X_n(zx) \mid Z_{1:n-1}(zx))}{\int p(Z_n(zx) \mid X_n(zx))p(X_n(zx) \mid Z_{1:n-1}(zx))dX_n(zx)} \quad (13)$$

The objective is to utilize three 2-D estimates from posterior probability density functions and fuse them into a single 3-D estimate.

The Equations (11) to (13) are only for the conceptual purpose which cannot in general be computed analytically except in special cases such as the linear Gaussian state space model. In any nonlinear system, particle filter approximates is the posterior distribution using a cloud of particles. Here, sequential importance sampling (SIS) is widely applied to perform nonlinear filtering. The SIS algorithm is for the required posterior pdf by a set of random samples with associated weights and to compute estimates based on these samples and weights. In addition, it derives sequential importance sampling (SIR) particle filter algorithm which chooses the candidates of importance density and performs the resampling step at every time-instant. The SIR algorithm forms the basis for most of the proposed particle filters. In this paper, we apply SIR particle filter which has generic particle filtering algorithm for an object tracking. Under the assumption in which nonlinear functions fn-1 and $h_n$ in (11) to (13) are known, SIR PF method has the advantage that the importance weights are easily evaluated and the importance density can be easily sampled.

Several dynamic models have been proposed which aim for the time-varying location and velocity. Especially, in bearings-only tracking, there are provided a Constant Velocity (CV) model, a Clockwise Coordinated Turn (CT) model, and an Anti-clockwise Coordinated Turn (ACT) model, which are expressed as $$F_n^{(1)} = \begin{pmatrix} 1 & T_s & 0 & 0 \\ 0 & 1 & 0 & 0 \\ 0 & 0 & 1 & T_s \\ 0 & 0 & 0 & 1 \end{pmatrix} \quad (14)$$

$$F_n^{(p)} = \begin{pmatrix} 1 & \frac{\sin(\Re_k^{(p)}T_s)}{\Re_k^{(p)}} & 0 & -\frac{(1-\cos(\Re_k^{(p)}T_s))}{\Re_k^{(p)}} \\ 0 & \frac{(1-\cos(\Re_k^{(p)}T_s))}{\Re_k^{(p)}} & 1 & \frac{\sin(\Re_k^{(p)}T_s)}{\Re_k^{(p)}} \\ 0 & \cos(\Re_k^{(p)}T_s) & 0 & -\sin(\Re_k^{(p)}T_s) \\ 0 & \sin(\Re_k^{(p)}T_s) & 0 & \cos(\Re_k^{(p)}T_s) \end{pmatrix} \quad (15)$$

where p=2, 3 and $\Re_n^{(p)}$ is called mode conditioned turning rates expressed as following;

$$\Re_n^{(2)} = \frac{\alpha}{\sqrt{v_{x,n}^2 + v_{y,n}^2}}, \Re_n^{(3)} = \frac{-\alpha}{\sqrt{v_{x,n}^2 + v_{y,n}^2}}$$

where α is the factor determining rotated angle degree. In this paper, by modifying (14), the CA model, which also represents the CV model, is revised as $$F_n^{xy} = \begin{pmatrix} 1 & \frac{A_x T_s^2}{2V_{x,n-1}} + T_s & 0 & 0 \\ 0 & \frac{A_x T_s}{V_{x,n-1}} + 1 & 0 & 0 \\ 0 & 0 & 1 & \frac{A_y T_s^2}{2V_{y,n-1}} + T_s \\ 0 & 0 & 0 & \frac{A_y T_s}{V_{y,n-1}} + 1 \end{pmatrix} \quad (16)$$

where Ax and Ay denotes acceleration in a x-y plane. For the other planes, y-z and z-x planes, Ax and Ay are replaced according to the target state vector. Furthermore, the CA model becomes the CV model when the values of Ax and Ay are zeros.

After a dynamic model propagates a previous set of M particles $X_{n-1}^{1:m}P$) in each plane P, the new set of particles $X_n^{1:m}(P)$ is generated, and then an observation likelihood function $p(Z_n(P)|X_n^{1:m}(P))$ is formulated as Gaussian distributions. The observation likelihood function $p(Z_n(P)X_n^{1:m}(P))$ calculates weights of the generated particles and estimates the object state vector $X_n(P)$ through a resampling process in each plane P.

There will be described a method of selecting projected planes for tracking an object in a three-dimensional space, according to an embodiment of the present invention. Hereinafter, the method of selecting projected planes is referred to as a Projected Planes Selection (PPS) method. First, there will be described plane selection and particle generation in the PPS method, and then, there will be described a combining method considering redundancy.

Planes selection and particles generation: Instead of using particle filter formulation for 3-D directly, the approach is to use at least two out of three possible 2-D particle filter formulations in order to estimate 3-D state information. In the PPS method, we choose the two planes with the smallest variance according to FIG. 2 and FIG. 3. Note that x-y plane is always chosen because the variance for this plane is the second best plane with the same variance as the originally measured azimuth angle. The remaining one is selected based on the measured angle. For example, when both angles are in between 45° and 135°, the plane y-z is chosen. Otherwise, the plane z-x is chosen.

Figure 4:
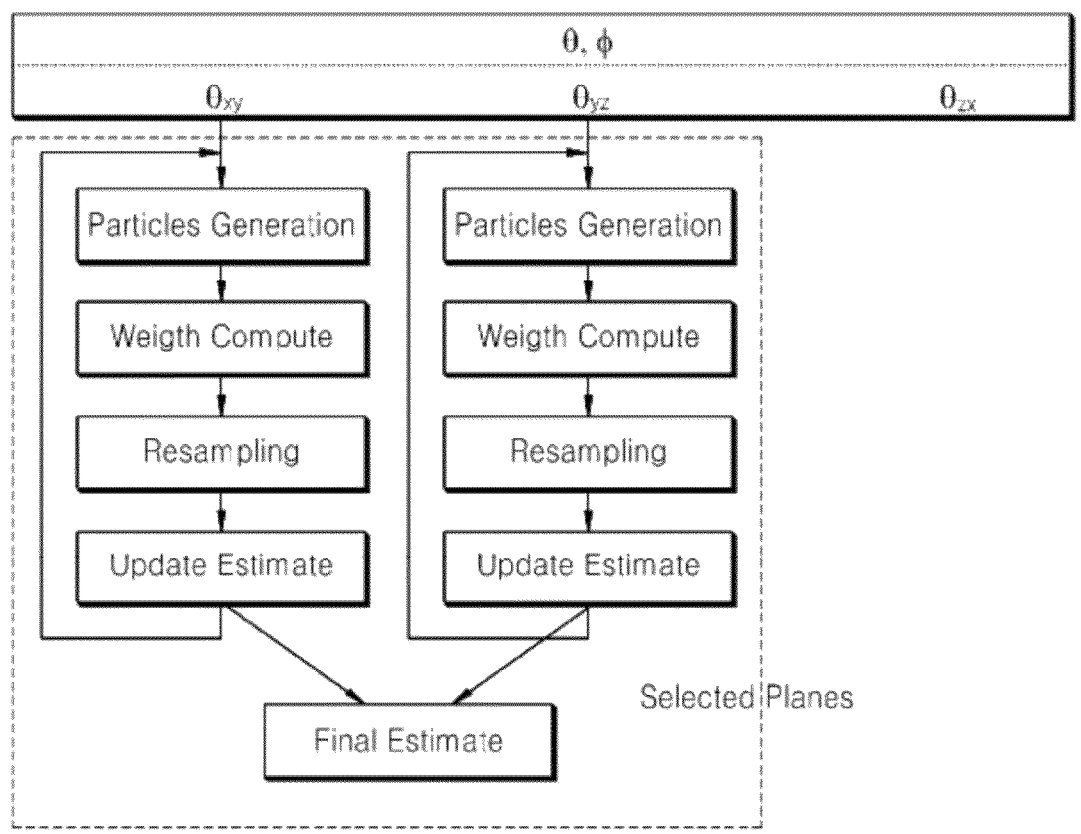
FIG. 4 illustrates a case where xy and yz planes are selected in projection plane selection according to an embodiment of the present invention.

Once the planes are selected, the 2-D particle filters estimates states independently. FIG. 4 illustrates an example where x-y and y-z planes are chosen to (i.e., the projected measurement variance in y-z plane is less than the variance in z-x plane according to the originally measured θ and φ). FIG. 4 illustrates the two selected independent 2-D particle filters for the 3-D state vector estimations. While the particle filters in the chosen planes estimate the state vector, the particle filter in the other remained plane is waiting for the selection. When the observed is object is coming to the range where the projected measurement variance for the remained plane becomes less, the plane selection will be changed.

Regardless of which two planes are selected, there is one redundant component that appears in both plane (i.e., y component appears in x-y and y-z planes). However, since two particle filters are estimating the states independently, the y component from two particle filters may differ. As discussed in (7) through (10), the intermediate 2-D target state vectors are $[x_n(xy), Vx_n(xy), y_n(xy), Vy_n(xy)]$ from the x-y plane particle filter, $[y_n(yz), Vy_n(yz), z_n(yz), Vz_n(yz)]$ from the y-z plane particle filter. The final 3-D target state vector $X_n$ will be determined by combining the two estimations.

Redundancy consideration in combining method: We previously stated that the plane selection method always generates redundancy. For example, when planes x-y and y-z are selected, y direction state vectors are obtained from the particle filters from the two planes. There are two ways to combine redundant information for y direction state vectors: the planes weighted combining and the equal weight combining. The equal weight combining method simply takes an average value imposing equal weight to the redundant component y. On the other hand, in the planes weighted combining method, the redundant component is weighted according to the particles weight-sum $$\sum_{i=1}^{M} w_n^{(i)}.$$

The value of the particle weight-sum roughly indicates the reliability of the state estimation. The weight-sums of the two filters $$\sum_{i=1}^{M} w_n^{(i)}(P)$$

are weights on each plane filter for the final estimation where P represents the selected planes. Based on each plane weight, planes weighted combining method is considered. In the case of selected planes x-y and y-z planes, the final 3-D target state vector $X_n$ based on the planes weighted combining method is $$X_n = X_n(x \mid xyz)\begin{pmatrix} 1 & 0 & 0 & 0 & 0 & 0 \\ 0 & 1 & 0 & 0 & 0 & 0 \end{pmatrix} \quad (17)$$

$$+ X_n(y \mid xyz)\begin{pmatrix} 0 & 0 & 1 & 0 & 0 & 0 \\ 0 & 0 & 0 & 1 & 0 & 0 \end{pmatrix}$$

$$+ X_n(z \mid xyz)\begin{pmatrix} 0 & 0 & 0 & 0 & 1 & 0 \\ 0 & 0 & 0 & 0 & 0 & 1 \end{pmatrix}$$

where Xn(x|xyz), Xn(y|xyz) and Xn(z|xyz) respectively represent final x, y and z state vector for the final 3-D state vector expressing $$X_n(x \mid xyz) = X_n(x \mid xy) \quad (18)$$

$$X_n(y \mid xyz) = \frac{X_n(y \mid xy)\sum_{i=1}^{M} w_n^{(i)}(xy) + X_n(y \mid yz)\sum_{i=1}^{M} w_n^{(i)}(yz)}{\sum_{i=1}^{M} w_n^{(i)}(xy) + \sum_{i=1}^{M} w_n^{(i)}(yz)} \quad (19)$$

$$X_n(z \mid xyz) = X_n(z \mid yz) \quad (20)$$

where Xn(x|xy) represents the x component of 2-D state vector in x-y plane. Note that since the equal weight combining method ignores the weights-sum of each plane, the redundant component y in (19) based on the equal weight combining method is replaced as $$X_n(y \mid xyz) = \frac{X_n(y \mid xy) + X_n(y \mid yz)}{2} \quad (21)$$

Hereinafter, there will be described comparison between the PPS method according to an embodiment of the present invention and a method of directly to extending to three-dimensional object tracking (hereinafter, referred to as "a direct three-dimensional method").

Effectiveness of the Planes Weighted Combining Method: Thus far, we assumed that the nonlinear dynamic transition matrix $f_n$ is known. If the dynamic model $f_n$ changes to $g_n$ in the middle of tracking without any change information to particle filter, the tracking may diverge. Suppose that an object is displaced with a dynamic model $g_n$ in a plane P, but particle filtering uses a dynamic model $f_n$. Then, true source state vector is $g_n(X_{n-1}(P))$ while a particle filter formulates following observation likelihood function:

$$p(Z_n(P)|X_n^{(1:M)}(P)) = p(Z_n(P)|f_n(\hat{X}_{n-1}^{(1:M)}(P))) \quad (22)$$

Since the dynamic models of an object and particle filter are different, the estimation is definitely diverged.

$$X_n(P) \sim f_n(X_{n-1}^{(1:M)}(P)) \neq g_n(X_{n-1}(P)) \quad (23)$$

Furthermore, if the state of the unmatched model lasts longer, the estimation may not recover even after matching the models. The planes weighted combining method discards the estimation from the plane with negligent particles weights sum based on $p(Z_n(P)|X_{n-1}^{1:m}(P))$, and thus prevents the estimation from deviation.

The equal weight combining and the planes weighted combining methods may have similar tracking performance if all selected plane-particle filters track an object well. However, if one of two particle filters unreliably tracks an object, the weighted combining method performs better. Table 1 and Table 2 show the comparison between the two combining methods. 1000 particles are used in generating the results.

TABLE 1

|         | Equal Weight Combining | Weighted Combining |
|---------|------------------------|--------------------|
| x error | 1.7399                 | 1.7479             |
| y error | 0.5641                 | 0.5589             |
| z error | 1.7334                 | 1.7408             |
| MSE     | 1.3458                 | 1.3492             |

TABLE 2

|         | Equal Weight Combining | Weighted Combining |
|---------|------------------------|--------------------|
| x error | 1.7541                 | 1.7263             |
| y error | 15.690                 | 0.5914             |
| z error | 1.4675                 | 1.7063             |
| MSE     | 6.3037                 | 1.3413             |

Figure 5:
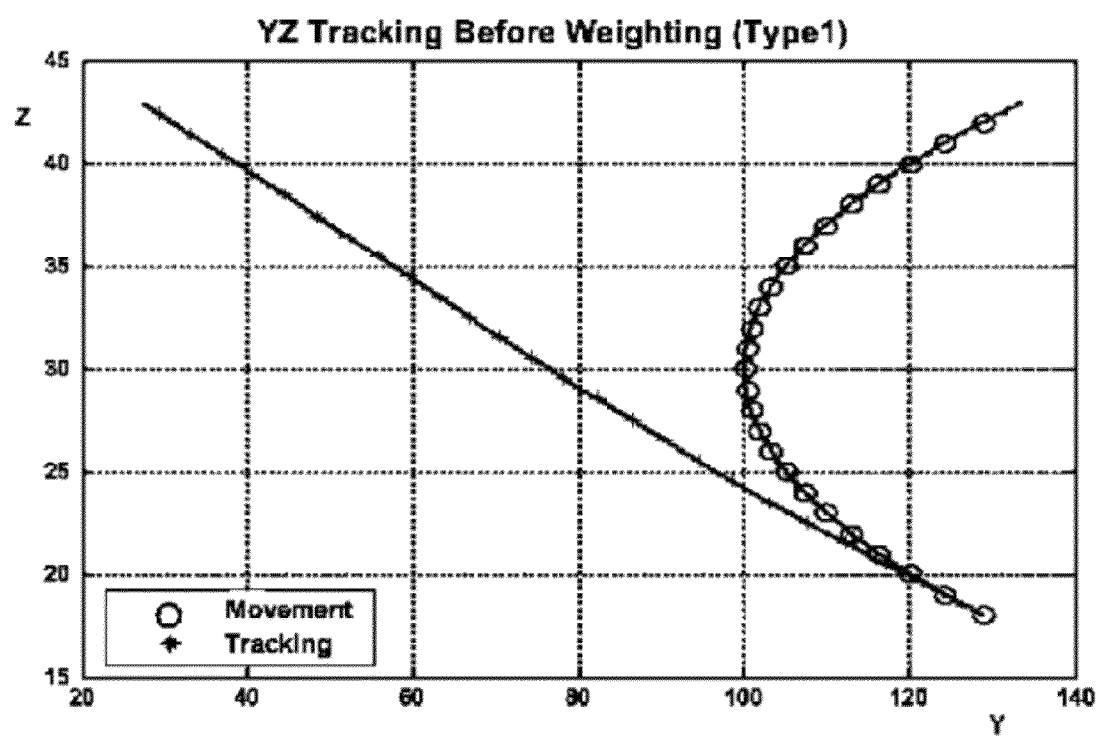
FIG. 5 illustrates a tracking deviation on a yz plane where a combining is method according to an embodiment of the present invention is not used.
Figure 6A:
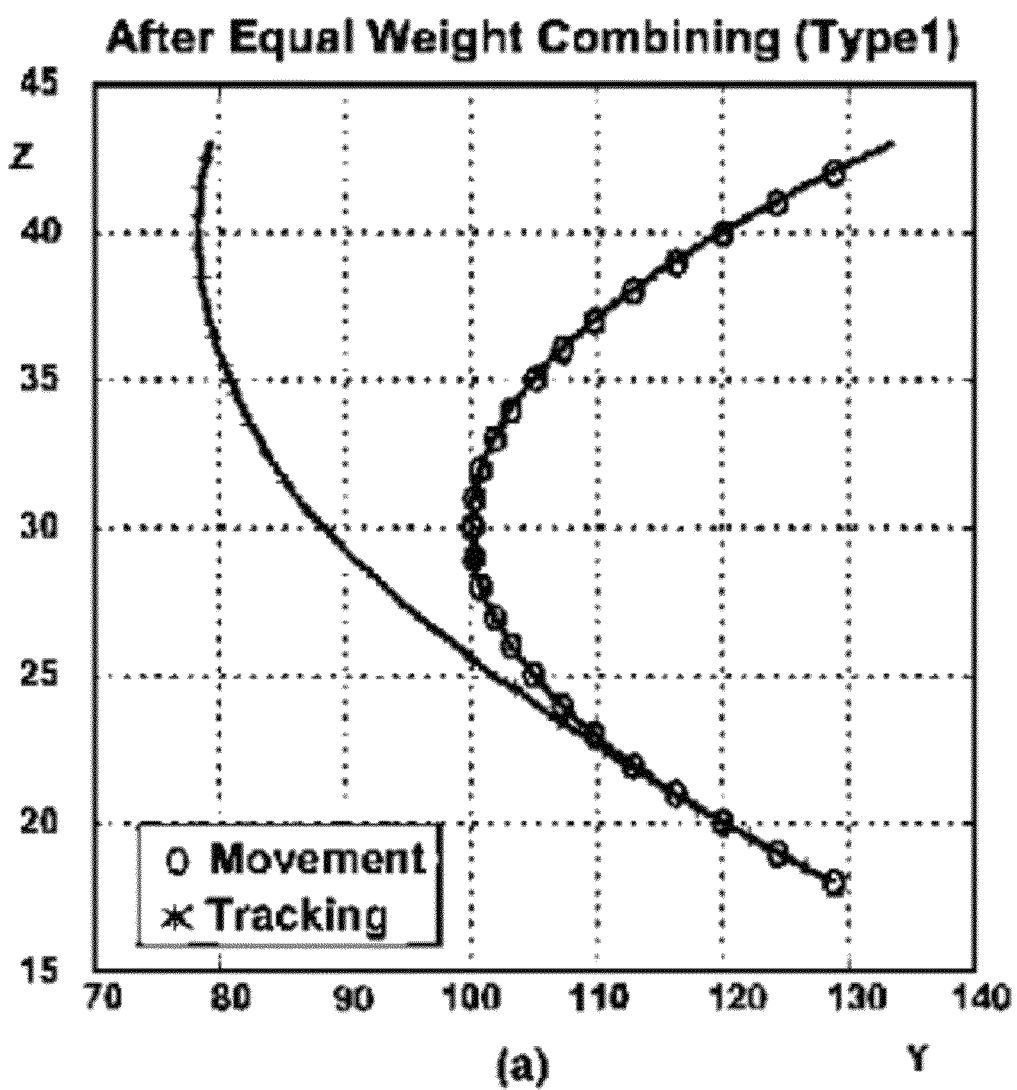
FIGS. 6(a)-(b) illustrates object tracking based on the combining method.
Figure 6B:
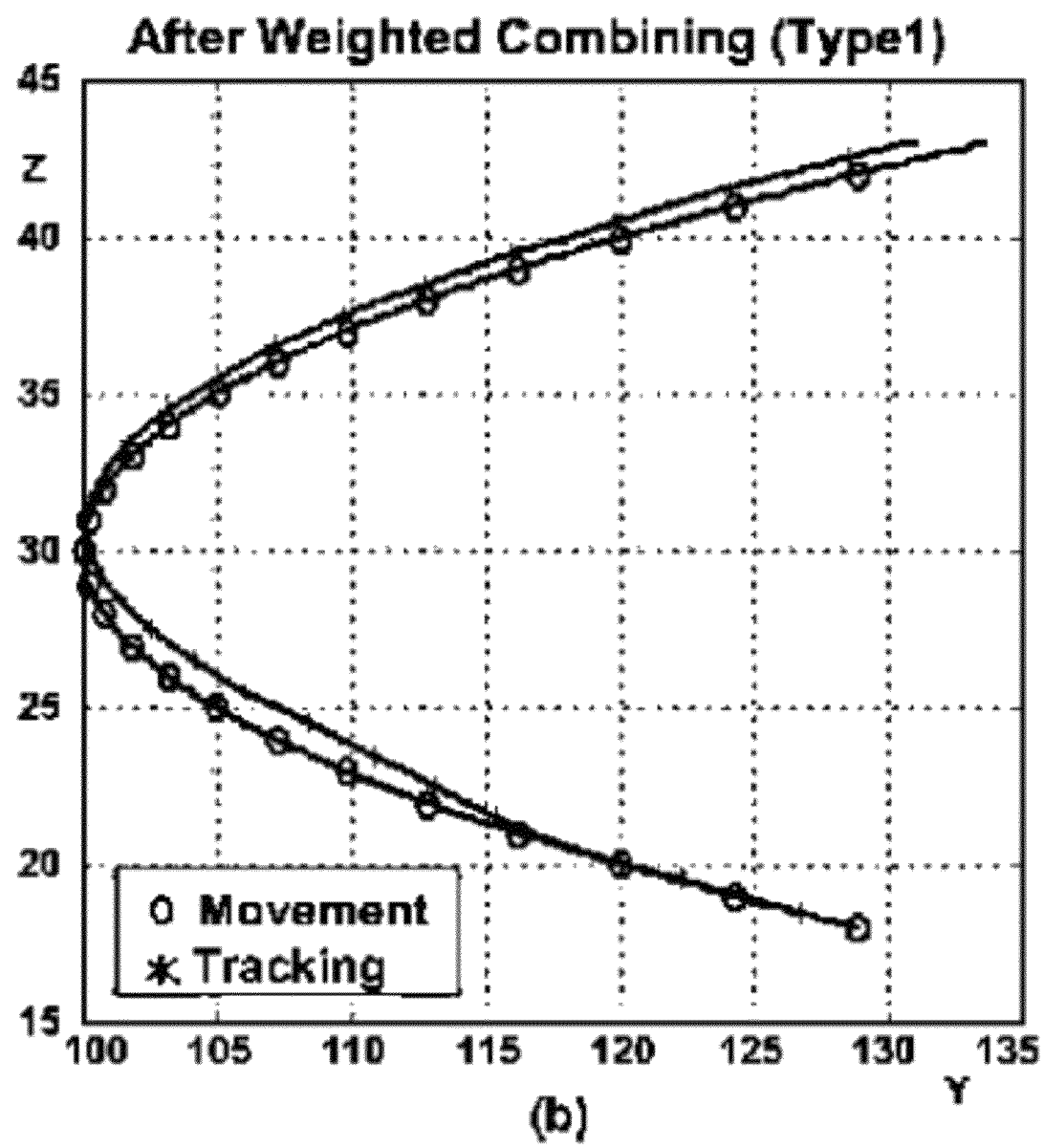

Table 1 represents error rate (%) when all plane-particle filters have good tracking accuracy. As shown in the table, two methods have the almost same result. However, when the particle filter for one of two planes tracking is unreliable, the planes weighted combining method compensates as shown in Table 2 II. (i.e., malfunction of a particle filter may be caused by abrupt moving trajectory or radius error which tracks only angles, not distance from a sensor). Note the error rate of y direction component. The phenomenon is shown in FIG. 5 and FIG. 6 as a simulation result. The selected planes are x-y and y-z planes, and y direction estimated state vectors are modified. FIG. 5 represents the tracking deviation in a y-z plane without combining method. FIG. 6 represents the tracking based on the combining method. Especially in FIG. 6(*b*), it is shown that planes weighted combining method enhances the tracking performance by considering the contribution from different plane accordingly.

Figure 7:
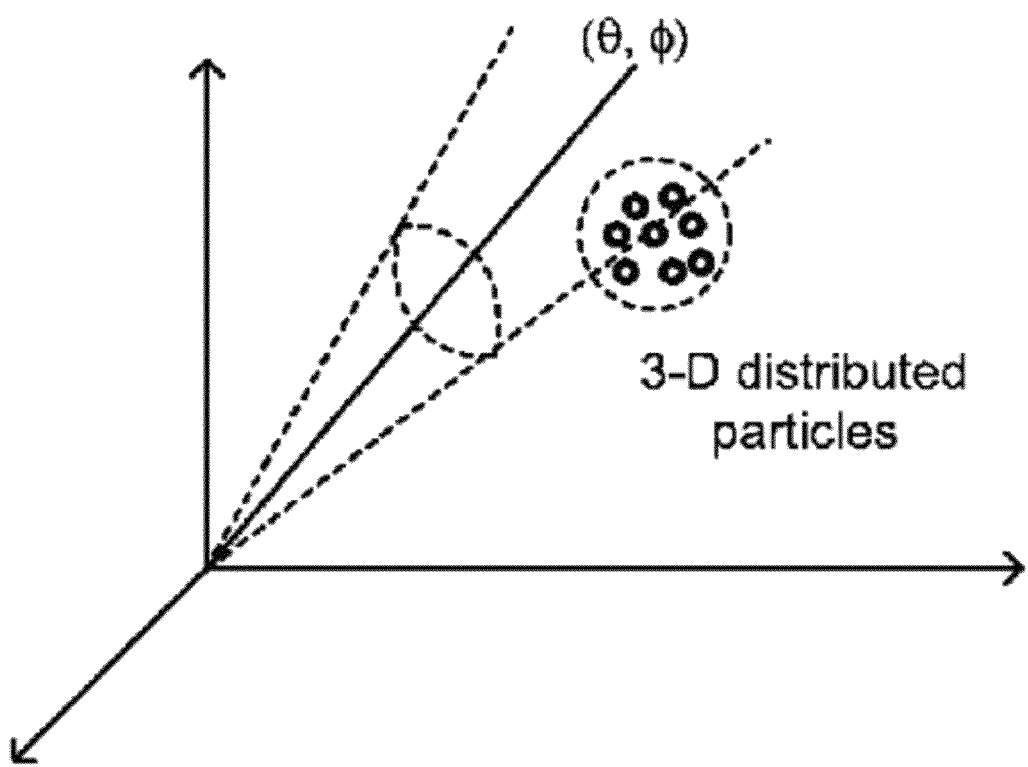
FIG. 7 illustrates a cone-shaped likelihood function for three-dimensionally distributed particle weights.

Comparison with Direct 3-D Method: The PPS method approximates the estimate of the direct 3-D method which has a 3-D target state model. FIG. 7 illustrates the direct 3-D method which has cone-shaped likelihood for assigning 3-D distributed particle weights. The PPS method has the same effect which the two variables observation likelihood function and 3-D distributed particles are projected onto two selected planes. Since planes are selected with a small variance according to the given projected measurement variance, PPS is better estimator comparing direct 3-D Method. The comparison of performance will be evaluated based on Cramer-Rao Low bound (CRLB). CRLB will be described later in detail.

Hereinafter, there will be described a method of tracking an object in a three-dimensional space by using multiple sensors according to an embodiment of the present invention.

Figure 8:
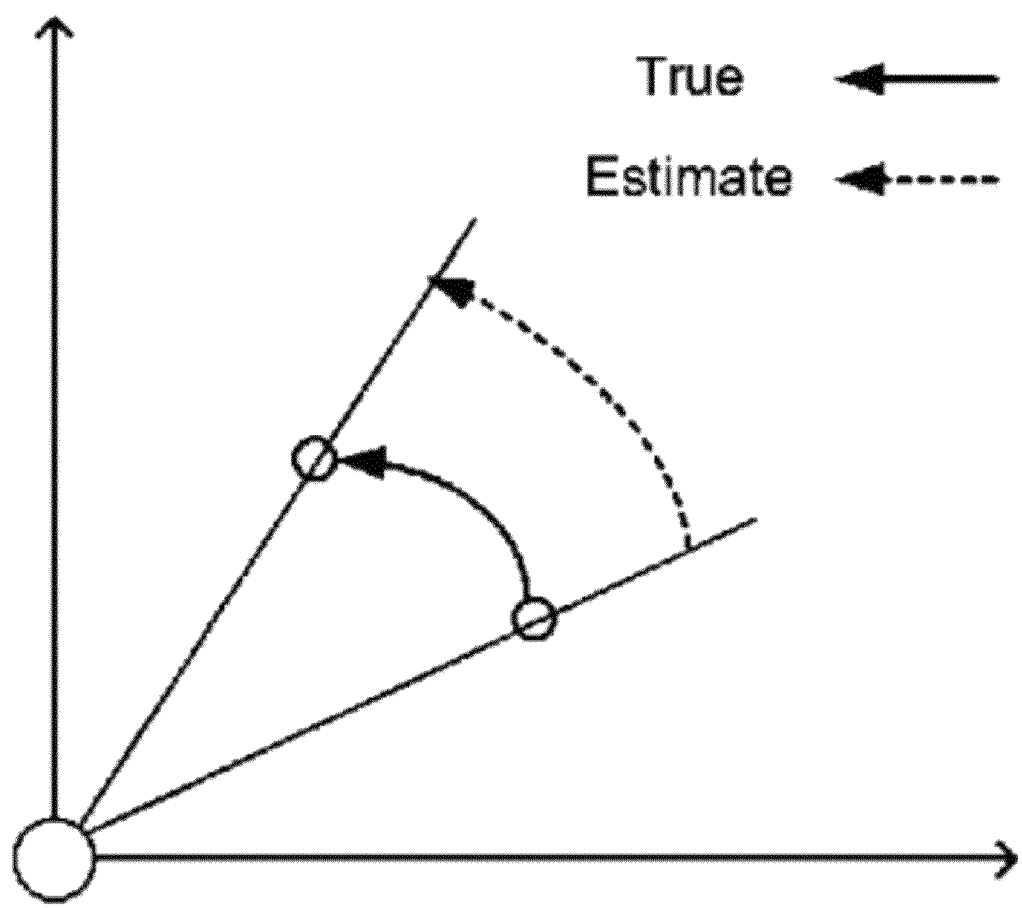
FIG. 8 illustrates radial error estimation with one angle.

The tracking trajectory deviation due to the unexpected change of an object dynamic model in (23) can be partially solved by the planes weighted combining method. However, single particle filter is unable to distinguish radial error which is illustrated in FIG. 8. For this reason, the multiple sensors based particle filtering has been introduced for robust tracking even when the measurement of one of the particle filter is severely corrupted. In this section, we present several approaches and sensor selection methods.

First, there will be described a dynamic model and measurement function transformation.

For an additional measured angle obtained from the kth sensor located at $(x_{n(s)}^k, y_{n(s)}^k)$, the measurement function is revised as $$Z_n'^k = h'(X_n^k) + E_n' \tag{24}$$

where $$h'(X_n^k) = \tan^{-1} \frac{y_n - y_{n(s)}^k}{x_n - x_{n(s)}^k} \tag{25}$$

Figure 9:
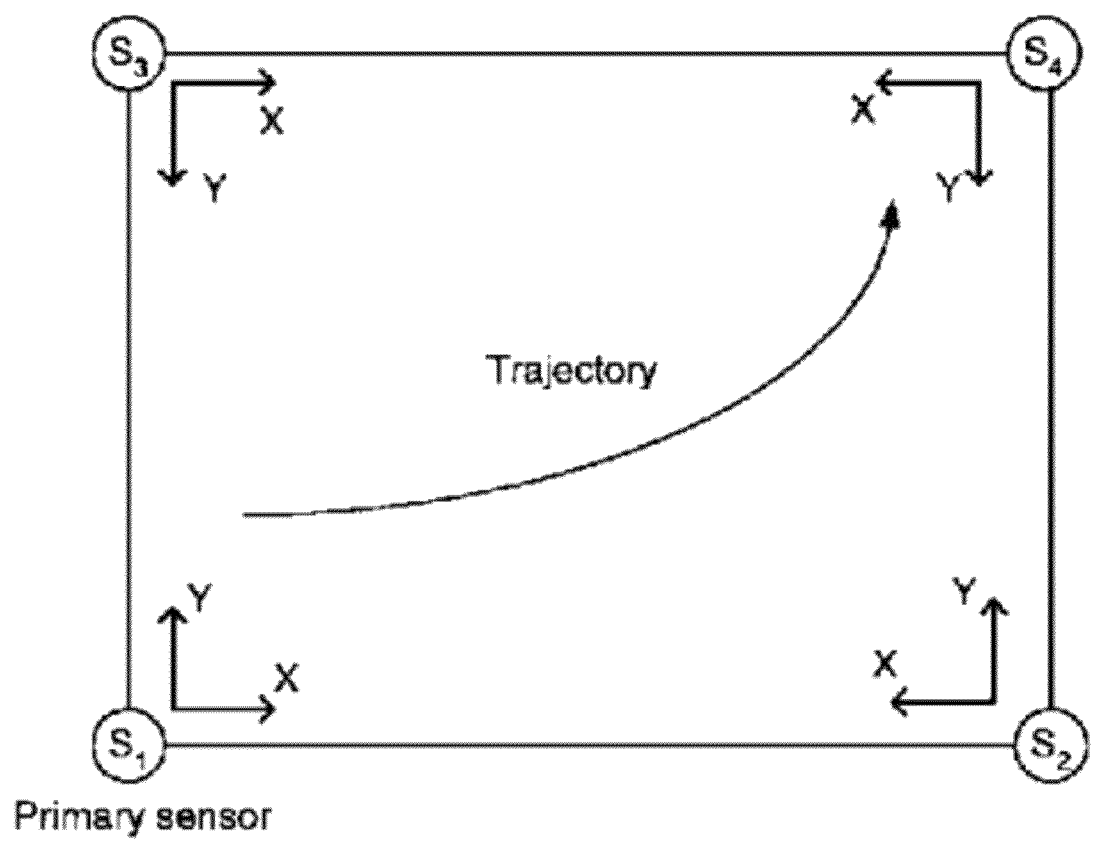
FIG. 9 illustrates coordinate systems with respect to global coordinates, that is, primary sensor coordinate systems.

The primary sensor, S1, is assumed to be placed at the origin as shown in FIG. 9. FIG. 9 illustrates relative coordinate systems with respect to the global coordinate (i.e., the coordinate system for the primary sensor). Each of the coordinate systems must satisfy (25).

The object dynamic model is also transformed for each sensor. Since the additional sensors shown in FIG. 9 have a different coordinate system, respectively, the target dynamic models are transformed with respect to the primary sensor coordinate systems as $$F_n[S2] = \begin{pmatrix} 1 & \frac{-A_x T_s^2}{2V_{x,n-1}} + T_s & 0 & 0 \\ 0 & \frac{-A_x T_s}{V_{x,n-1}} + 1 & 0 & 0 \\ 0 & 0 & 1 & \frac{A_y T_s^2}{2V_{y,n-1}} + T_s \\ 0 & 0 & 0 & \frac{A_y T_s}{V_{y,n-1}} + 1 \end{pmatrix} \tag{26}$$

$$F_n[S3] = \begin{pmatrix} 1 & \frac{A_x T_s^2}{2V_{x,n-1}} + T_s & 0 & 0 \\ 0 & \frac{A_x T_s}{V_{x,n-1}} + 1 & 0 & 0 \\ 0 & 0 & 1 & \frac{-A_y T_s^2}{2V_{y,n-1}} + T_s \\ 0 & 0 & 0 & \frac{-A_y T_s}{V_{y,n-1}} + 1 \end{pmatrix} \tag{27}$$

$$F_n[S4] = \begin{pmatrix} 1 & \frac{-A_x T_s^2}{2V_{x,n-1}} + T_s & 0 & 0 \\ 0 & \frac{-A_x T_s}{V_{x,n-1}} + 1 & 0 & 0 \\ 0 & 0 & 1 & \frac{-A_y T_s^2}{2V_{y,n-1}} + T_s \\ 0 & 0 & 0 & \frac{-A_y T_s}{V_{y,n-1}} + 1 \end{pmatrix} \tag{28}$$

where Fn[S2], Fn[S3] and Fn[S4] are the transformed dynamic models with respect to each sensor S2, S3 and S4.

There will be described an independent K-multiple sensors (IMS) method according to a first embodiment of the according to an embodiment of the present invention.

We consider tracking with two sensors out of K sensors. The objective is to select most effective two sensors for tracking. While the number of sensors can be extended to consider more than 2 sensors, we limit our discussion to two sensors. First, the best plane (i.e., with lowest measurement variance) from each sensor is selected. Among the selected K planes, the best two planes are again selected based on the measurement $\theta$ and $\phi$. The y-z plane is selected when $\theta$ is in the range between 45° and 135° and $\phi$ is close to 0° or 180°. This selection is based on FIG. 2. In contrast, the z-x plane is selected when $\theta$ is in the range between 0° and 45°, or 135° and 180°, and $\phi$ is close to 90° or 270°. This selection is based on FIG. 3. Note that in order to avoid selecting the two planes estimating same components, consideration of the second best planes selection for different planes is required.

After planes selection, each particle filter estimates the target state vector independently. For an estimated 3-D state vector in combining method, similarly to the planes weighted combining method of single sensor, the nodes weighted combining method is proposed to weight the selected sensor nodes. For the reliability criterion of each sensor node, particles weights-sum obtained from the two planes are considered similarly to single sensor.

In the case of selecting y-z plane from sensor U and z-x plane from sensor V, the nodes weight is derived as $$W_n^U = \sum_{i=1}^{M} w_n^{U(i)}(yz) \tag{29}$$

$$W_n^V = \sum_{i=1}^{M} w_n^{V(i)}(zx) \tag{30}$$

where $w_n^{k(1)}(P)$ represents the ith particle weight in a p plane of the kth sensor. In the same planes selection, the final estimated state vector of each component $X_n(x|xyz)$, $X_n(y|xyz)$ and $X_n(z|xyz)$ is $$X_n(x \mid xyz) = X_n^V(x \mid zx). \tag{31}$$

$$X_n(y \mid xyz) = X_n^U(y \mid yz). \tag{32}$$

$$X_n(z \mid xyz) = \frac{X_n^U(z \mid yz) W_n^U + X_n^V(z \mid zx) W_n^V}{W_n^U + W_n^V} \tag{33}$$

Finally, (17) is used to obtain the final 3-D state vectors.

Next, there will be a common-resampling K-multiple sensors method according to a second embodiment of the present invention.

Figure 10:
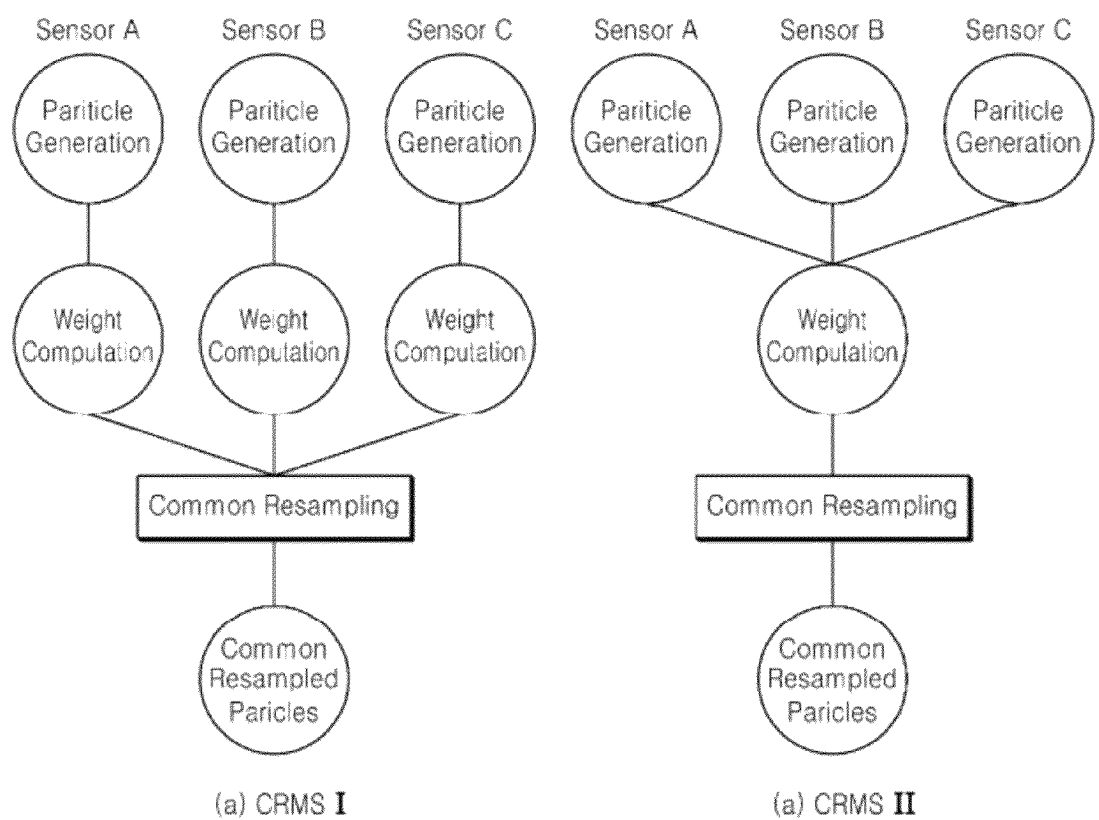
FIG. 10 illustrates two methods for common resampled particles.

Common-Resampling K-Multiple Sensors (CRMS) algorithm employs redundancy within the selected planes (i.e., multiple x-y, y-z and/or z-x planes). Instead of selecting 2 planes as in the IMMS, the CRMS selects R planes with the lowest observation input variance. In the CRMS algorithm, the multiple sensors is depend on each other. FIG. 10 illustrates the two possible methods for common resampled particles.

Figure 11:
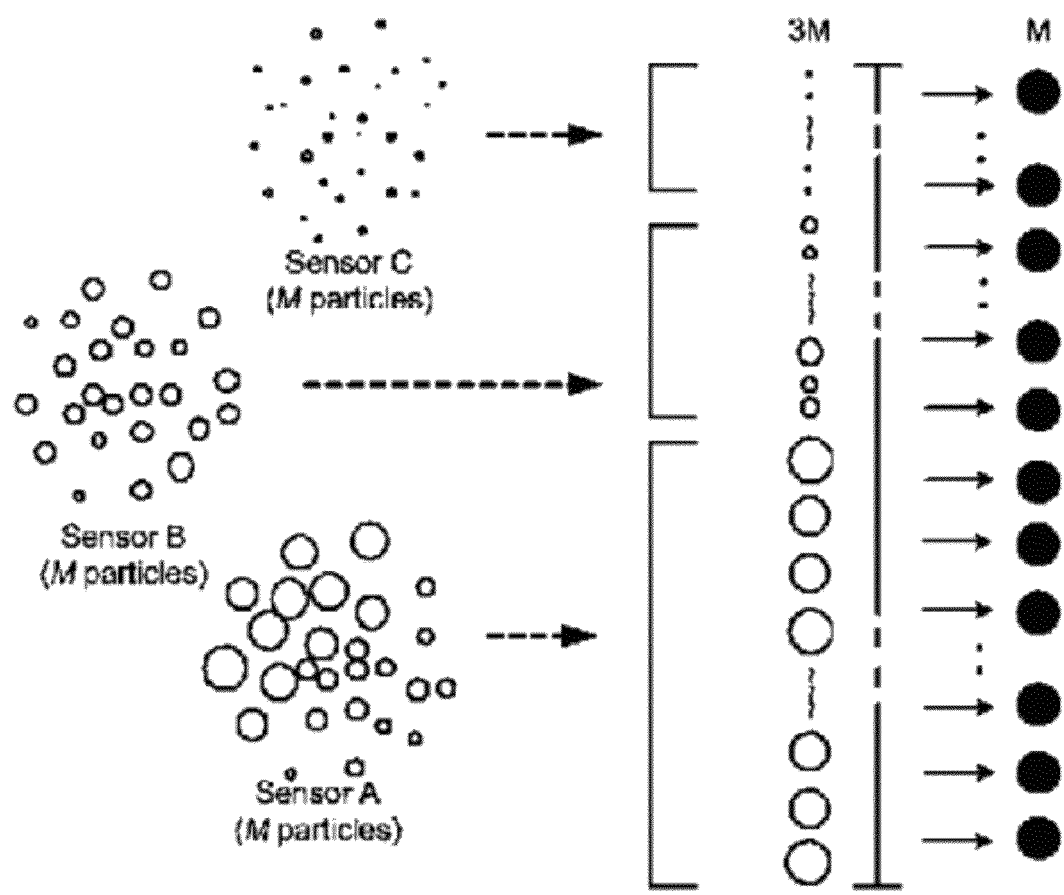
FIG. 11 illustrates a process of resampling multiple sensors.

CRMS-I: As shown in FIG. 10(a), each sensor generates particles and computes their weights independently but the common resampled particles are obtained through integrating all particles. The resampling process of multiple sensors is illustrated in FIG. 11. The sizes of circles represent the weights of the particles. From the resampling process, the plane with larger weights-sum of particles contributes more for the final estimation. The final estimated state vector of CRMS-I is the same as IMS calculation with new common resampled particles.

Figure 12:
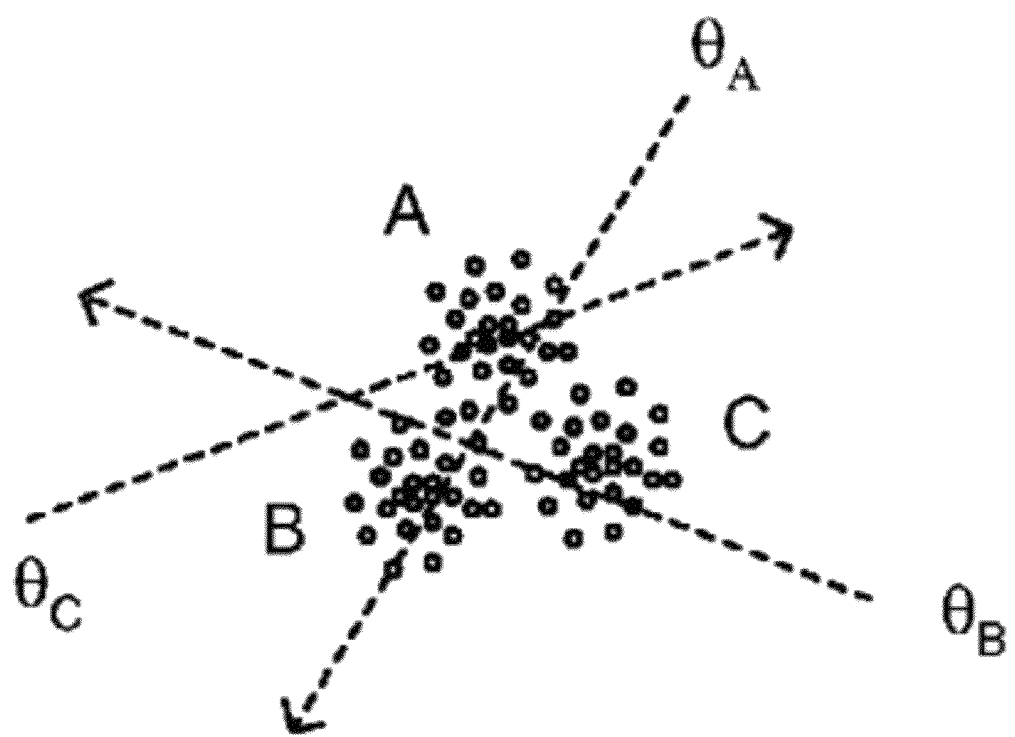
FIG. 12 illustrates weight calculation in CRMS-II.

CRMS-II: FIG. 10(b) illustrates an alternative method for generating the common resampled particles. In this method, the particles are generated independently, but the weight computation is performed on all particles at the same time. After the common particles weights calculation, resampling process is operated in the same way as CRMS-I. CRMS-II associates particles of each sensor node from weight computation while CRMS-I associates them from resampling process. The rest of estimation process is the same as the method of CRMS-I. The CRMS-II weights calculation is illustrated in FIG. 12. Each cluster of particles from R same planes are gathered and the particles weights $w_n^{(i)}(p)$ are calculated by measured angles from selected R sensors. The particles weights are computed R times for R×M particles weights as following:

$$w_n^{(i)}(P) = \prod_{k=1}^{R} w_n^{k(i)}(P) \tag{34}$$

where, $w_n^{k(i)}(P)$ is as follows. In this case, p(Zn|Xn) is likelihood function for assigning particles weights.

$$w_n^{k(i)}(P) = p\left(Z_n \;\middle|\; \sum_{k=1}^{R} X_n^{k(i)}(P)\right). \tag{35}$$

Next, there will be described a One Merged K-Multiple Sensors (OMMS) method according to a third embodiment of the present invention.

Figure 13:
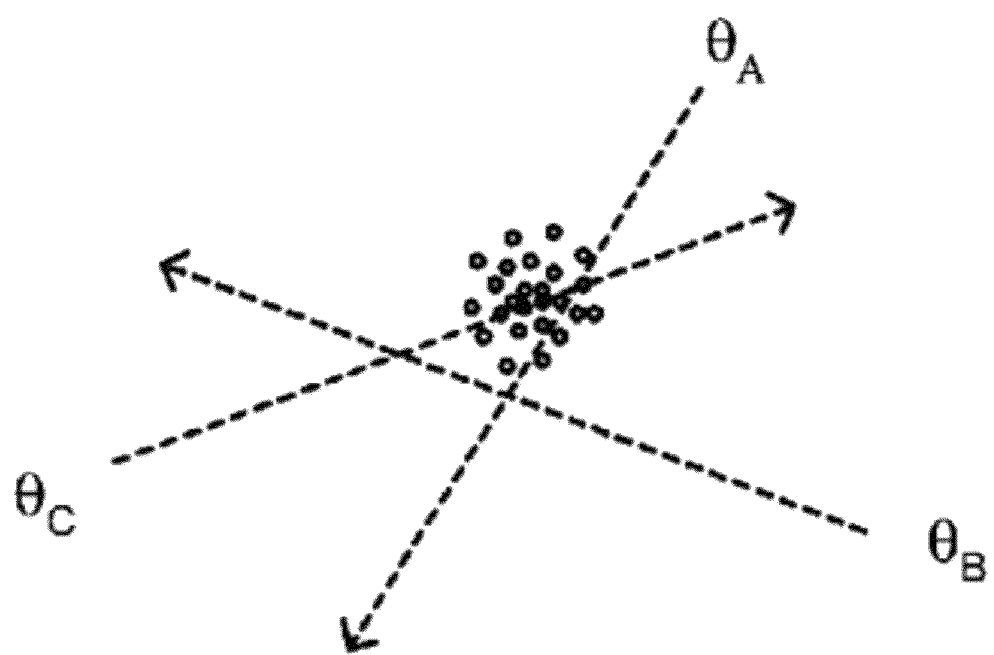
FIG. 13 illustrates particle weight calculation in $w_n^{(i)}(P)$ by using all values measured by R sensors selected according to an embodiment of the present invention.

OMMS algorithm also utilizes more than two selected planes. All received angles from R selected sensors are directly considered. Hence, the sensors are associated at the beginning stage (i.e, particles generation stage). All selected particle clusters are gathered in each plane which acts as a single sensor node. The difference between the OMMS and the single sensor PF is the number of measured angles. Particles weights calculation is illustrated in FIG. 13 where $w_n^{(i)}(P)$ are calculated by measured all angles from the selected R sensors. This weight computation method is similar to CRM-SII weights calculation except for the number of particles. OMMS particles weight is expressed in (36). The rest of estimation process is the same as the method using single sensor node.

$$w_{n,x|xy}^{Km} = \prod_k w_{n,k,x|xy}^{Km} \tag{36}$$

$$w_n^{(i)}(P) = \prod_{k=1}^{R} w_n^{k(i)}(P)$$

Hereinafter, there will be described sensor nodes association and complexity of the three-dimensional object tracking methods using multiple sensors according to an embodiment of the present invention.

Sensor nodes association: The four multiple sensors algorithms are classified according to sensor nodes association timing as shown in Table III. IMS algorithm implements particle filtering using entirely independent multiple sensor nodes except for combining final state vectors which are combined based on the nodes weighted combining method. The other algorithms CRMS-I, CRMS-II and OMMS associate the sensor nodes data or particles in each different particle filtering step. Note that a FC estimates the state vector after sensor nodes association.

TABLE 3

|  | IMS | CRMS-I | CRMS-II | OMMS |
|---|---|---|---|---|
| Particles generation | X | X | X | ○ |
| Weight computation | X | X | ○ | ○ |
| Resampling | X | ○ | ○ | ○ |

Complexity: Generally, in the selected R planes for each plane, algorithm IMS requires totally 3R 2-D particle filters since each of the selected 3R planes particle filters is implemented independently. However, when scheduling method using only the two best planes is applied, only two 2-D particle filters are required as same as the single sensor based PPS method.

Algorithm CRMS requires 3R 2-D particle filters since each of the selected R sensors generates particles in respective three planes. Commonly, R×M particles are newly resampled to M particles in each plane. In addition, in CRMS-II, R×M particles are gathered in each plane and weights are determined.

Algorithm OMMS requires totally only two or three 2-D particle filters; thus, a FC can simply manage particle filters with few planes. Except for R times weight computation comparing with single sensor estimation, all estimating process is the same as the complexity of single sensor estimation. Therefore, OMMS algorithm reduces the overall complexity among the proposed algorithms.

Next, there will be described performance analysis for the three-dimensional object tracking method according to an embodiment of the present invention. Particularly, the performance analysis is executed by using Cramer-Rao Lower Bound (CRLB). First, general CRLB will be described, and then, the performance analysis executed by using CRLB will be described. CRLB has been widely used as a reference in evaluating approximated solution. The CRLB represents the best achievable performance by identifying the low bound. The bound expression is derived assuming that the process noise $Q_n$ is zero for constant velocity (CV) model and constant acceleration (CA) model. The error covariance matrix $C_n$ of an unbiased estimator $\hat{X}_n$ of the state vector is bounded by $$C_n = E(\hat{X}_n - X_k)(\hat{X}_n - X_k)^T \qquad (37)$$

where E is the expectation operator. The CRLB expression is obtained from inverse of information matrix which is defined as $$J_n = E[\nabla x_n \log p(X_n|Z_n)][\nabla x_n \log p(X_n|Z_n)]^T \qquad (38)$$

where $J_n$ is the information matrix, $\nabla x_n$ denotes the gradient operator as to state vector $X_n$, and the diagonal elements of $J_n^{-1}$ represents the low bound.

In the absence of the process noise, the evolution of the state vector is deterministic resulting in $$J_{n+1} = [F_n^-]^T J_n F_n^{-1} + H_{n+1}^T R_{n+1}^{-1} H_{n+1} \qquad (39)$$

where $F_n$ is transition matrix that represents CV or CA as shown in (16), $R_{n+1}$ is the covariance matrix of the measurement variance $\sigma_\theta^2$, and $H_n$ is the gradient component of a measurement function $h_n$. $H_n$, referred to as Jacobian of $h_n$, is given by $$H_n = [\nabla x_{n+1} h_{n+1}^T (X_{n+1})]^T. \qquad (40)$$

In addition, $J_1$ for the initial bound is derived by the initial covariance matrix of the state estimate as following:

$$J_1 = C_1^{-1} \qquad (41)$$

where $C_1$ may be applied to an x-y plane as (42), which is applied in the same way for other planes such as y-z and z-x planes.

$$C_1 = \begin{pmatrix} \sigma_x^2 & 0 & \sigma_{xy}^2 & 0 \\ 0 & \sigma_{Vx}^2 + \frac{\sigma_{ax}^2}{T_s} & 0 & 0 \\ \sigma_{xy}^2 & 0 & \sigma_y^2 & 0 \\ 0 & 0 & 0 & \sigma_{Vy}^2 + \frac{\sigma_{ay}^2}{T_s} \end{pmatrix} \qquad (42)$$

The initial covariance matrix in (42) is given by the prior knowledge of target which is the range of initial position, speed and acceleration: initial target range $N(\bar{r}, \sigma_r^2)$ with $N(\bar{\theta}, \sigma_\theta^2)$, initial speed and acceleration $N(\bar{s}, \sigma_s^2)$ and $N(\bar{\alpha}, \sigma_\alpha^2)$ where $\bar{r}, \bar{\theta}, \bar{s}$ and $\bar{\alpha}$ are the mean values of initial distance, angle, speed and acceleration, and $\sigma_r^2, \sigma_\theta^2, \sigma_s^2$ and $\sigma_\alpha^2$ are the variances of initial distance, angle, speed and acceleration.

Through the conversion from polar to Cartesian coordinates, $\sigma_x^2$, $\sigma_y^2$ and $\sigma_{xy}^2$ are derived as following:

$$\sigma_x^2 = \bar{r}^2 \sigma_\theta^2 \sin^2 \bar{\theta} + \sigma_r^2 \cos^2 \bar{\theta} \qquad (43)$$

$$\sigma_y^2 = \bar{r}^2 \sigma_\theta^2 \cos^2 \bar{\theta} + \sigma_r^2 \sin^2 \bar{\theta} \qquad (44)$$

$$\sigma_{xy} = (\sigma_r^2 - \bar{r}^2 \sigma_\theta^2) \sin \bar{\theta} \cos \bar{\theta} \qquad (45)$$

Hereinafter, there will be described CRLB on the PPS method for a single sensor according to an embodiment of the present invention.

In the projection method for 3-D construction, three information matrices in (39) are generated in each plane. Here, for clear notation, we put the plane type on the upper-right of information matrix $J_n$ such as $J_n^p$ which represents $J_n^{xy}$, $J_n^{yz}$ and $J_n^{zx}$. In addition, transition matrix, measurement variance and Jacobian of $h_n$ are also denoted as $F_n^p$, $R_n^p$, and $H_n^p$, respectively. For further discussion, a dynamic model is assumed to be CV in an x-axis, CA with $A_y$ and $A_z$ in y and z-axis. Based on (16), transition matrices $F_n^p$ are derived as $$F_n^{xy} = \begin{pmatrix} 1 & T_s & 0 & 0 \\ 0 & 1 & 0 & 0 \\ 0 & 0 & 1 & \frac{A_y T_s^2}{2V_{y,n-1}} + T_s \\ 0 & 0 & 0 & \frac{A_y T_s}{V_{y,n-1}} + 1 \end{pmatrix} \qquad (46)$$

$$F_n^{yz} = \begin{pmatrix} 1 & \frac{A_y T_s^2}{2V_{y,n-1}} + T_s & 0 & 0 \\ 0 & \frac{A_y T_s}{V_{y,n-1}} + 1 & 0 & 0 \\ 0 & 0 & 1 & \frac{A_z T_s^2}{2V_{z,n-1}} + T_s \\ 0 & 0 & 0 & \frac{A_z T_s}{V_{z,n-1}} + 1 \end{pmatrix} \qquad (47)$$

-continued $$F_n^{zx} = \begin{pmatrix} 1 & \frac{A_z T_s^2}{2V_{z,n-1}} + T_s & 0 & 0 \\ 0 & \frac{A_z T_s}{V_{z,n-1}} + 1 & 0 & 0 \\ 0 & 0 & 1 & T_s \\ 0 & 0 & 0 & 1 \end{pmatrix} \quad (48)$$

The covariance matrix of the measurement variance $R_n^P$ is $\sigma_p^2$, which is a variance of bearing measurement in projected plane P (1×1 matrix for a single bearing). Here, we should consider the measurement variance enhancing estimation performance. As the projected measurement variance was shown in FIGS. 2 and 3, the raw bearings θ and φ are projected in three planes with different angle variance according to an object position. Therefore, plane selection based on small angle variance is expected to increase the estimation accuracy.

In the last stage, Jacobian $H_n^P$ is derived as $$H_n^{xy} = [\nabla x_{n+1}(xy) h_{n+1}^T(X_{n+1}(xy))]^T \quad (49)$$
$$= \begin{pmatrix} \frac{\partial(\tan^{-1}(\frac{y}{x}))}{\partial x} & 0 & \frac{\partial(\tan^{-1}(\frac{y}{x}))}{\partial y} & 0 \end{pmatrix}$$
$$= \begin{pmatrix} \frac{-y}{x^2+y^2} & 0 & \frac{x}{x^2+y^2} & 0 \end{pmatrix},$$

$$H_n^{yz} = [\nabla x_{n+1}(yz) h_{n+1}^T(X_{n+1}(yz))]^T \quad (50)$$
$$= \begin{pmatrix} \frac{\partial(\tan^{-1}(\frac{z}{y}))}{\partial y} & 0 & \frac{\partial(\tan^{-1}(\frac{z}{y}))}{\partial z} & 0 \end{pmatrix}$$
$$= \begin{pmatrix} \frac{-z}{y^2+z^2} & 0 & \frac{y}{y^2+z^2} & 0 \end{pmatrix},$$

$$H_n^{zx} = [\nabla x_{n+1}(zx) h_{n+1}^T(X_{n+1}(zx))]^T \quad (51)$$
$$= \begin{pmatrix} \frac{\partial(\tan^{-1}(\frac{x}{z}))}{\partial z} & 0 & \frac{\partial(\tan^{-1}(\frac{x}{z}))}{\partial x} & 0 \end{pmatrix}$$
$$= \begin{pmatrix} \frac{-x}{x^2+z^2} & 0 & \frac{z}{x^2+z^2} & 0 \end{pmatrix}.$$

Next, there will be described CRLB analysis in a direct 3-D method using a single sensor.

In the direct 3-D method, information matrix $J_n$ is expressed as 6×6 matrix. Note that transition matrix, measurement variance and Jacobian of $h_n$ for $J_n$ of 3-D state vector do not have upper-right denotation in contrast to the 2-D projection method. The low bound is directly obtained from (39) with extension of 2-D state vector based matrices. Here, transition matrix is expressed as $$F_n = \begin{pmatrix} 1 & T_s & 0 & 0 & 0 & 0 \\ 0 & 1 & 0 & 0 & 0 & 0 \\ 0 & 0 & 1 & \frac{A_y T_s^2}{2V_{y,n-1}} + T_s & 0 & 0 \\ 0 & 0 & 0 & \frac{A_y T_s}{V_{y,n-1}} + 1 & 0 & 0 \\ 0 & 0 & 0 & 0 & 1 & \frac{A_z T_s^2}{2V_{z,n-1}} + T_s \\ 0 & 0 & 0 & 0 & 0 & \frac{A_z T_s}{V_{z,n-1}} + 1 \end{pmatrix} \quad (52)$$

In this method, measured bearings vector $[\theta, \phi]^T$ are given with variances $\sigma_\theta^2$ and $\sigma_\phi^P$. We notice that the two bearings tracking are simply extended to multiple sensors tracking. For the 3-D state vector estimation, only single sensor detects bearings physically. However, the bearings measurement should be interpreted that different two sensors detect each angle at the same place. Thus, is the measurement error covariance $R_n$ and the Jacobian $H_{n+1}$ should be expressed in multiple sensors case following as $$R_n = \begin{pmatrix} \sigma_\theta^2 & 0 \\ 0 & \sigma_\phi^2 \end{pmatrix} \quad (53)$$

$$H_n = [\nabla x_{n+1}[h_{n+1}^{(1)}(X_{n+1}) h_{n+1}^{(2)}(X_{n+1})]]^T, \quad (54)$$

$$H_n = \begin{pmatrix} \frac{\partial h^{(1)}}{\partial x_{n+1}} & \frac{\partial h^{(1)}}{\partial V x_{n+1}} & \frac{\partial h^{(1)}}{\partial y_{n+1}} & \frac{\partial h^{(1)}}{\partial V y_{n+1}} & \frac{\partial h^{(1)}}{\partial z_{n+1}} & \frac{\partial h^{(1)}}{\partial V z_{n+1}} \\ \frac{\partial h^{(2)}}{\partial x_{n+1}} & \frac{\partial h^{(2)}}{\partial V x_{n+1}} & \frac{\partial h^{(2)}}{\partial y_{n+1}} & \frac{\partial h^{(2)}}{\partial V y_{n+1}} & \frac{\partial h^{(2)}}{\partial z_{n+1}} & \frac{\partial h^{(2)}}{\partial V z_{n+1}} \end{pmatrix} \quad (55)$$

$$= \begin{pmatrix} \frac{-y}{x^2+y^2} & \frac{xz}{(x^2+y^2+z^2)\sqrt{x^2+y^2}} \\ 0 & 0 \\ \frac{x}{x^2+y^2} & \frac{yz}{(x^2+y^2+z^2)\sqrt{x^2+y^2}} \\ 0 & 0 \\ 0 & \frac{-\sqrt{x^2+y^2}}{(x^2+y^2+z^2)\sqrt{x^2+y^2}} \\ 0 & 0 \end{pmatrix}^T$$

where $h_n^{(1)}$ and $h_n^{(2)}$ are measurement function of bearings θ and φ, respectively.

Next, there will be described CRLB analysis in the PPS method for multiple sensors according to an embodiment of the present invention.

For the continuous estimation evaluation based on the low bound, the evaluation by multiple sensors are worthy of being considered under the several proposed fusion methods. However, the fusion method cannot be entirely applied to the CRLB because the bound considers only dynamic model, measurement function with error covariance and the prior knowledge of initial state vector and external factors in the absence of process noise. Thus, we will address the several possible bounds only with formulating the direct 3-D method and our proposed PPS method with more choices due to multiple sensors. Given the possible boundaries, we will analyze the performance related to the proposed fusion method indirectly and finally compare with the single sensor estimation. Note that the direct 3-D method results in only one single boundary while the planes-projection estimation results in several ones. The reason is explained in this part and we learn the flexibility of the proposed method, which is more advantageous than the direct 3-D method.

In the PPS method with multiple sensors, generally 6R low boundaries are obtained where R is the number of selected planes. Importantly, all factors affecting CRLB, which are $F_n$, $R_n$, and $H_n$ are considered to be transformed according to each selected sensor. Based on the different factors, we derive the 3R evolving information matrices in general:

$$J_{n+1}^P[k] = [F_n^{P-1}[k]]^T J_n^P[k] F_n^{P-1}[k] + H_{n+1}^T[k] R_{n+1}^{-1}[k] H_{n+1}^P[k] \quad (56)$$

where p denotes a plane (i.e., x-y, y-z or z-x plane) and k denotes a sensor index.

The dynamic models $F_n^P[k]$ are transformed with respect to each position as discussed in Section IV-A where transformed dynamic model in the view of sensors are derived in (26) through (28), and k=1, 2, 3, . . . , R for the number of selected sensors. The 3R dynamic models $F_n^P[k]$ are derived with transformation based on (46) through (48) incorporated to (26) through (28).

The measurement covariance error $R_{n+1}^{P-1}[k]$ is denoted as the variance of bearing measurement as explained. Here, the main advantages of using multiple sensors are addressed. The advantage is not only increasing the estimation accuracy based on multiple trials positioned in different locations, but also having a variety of choices for planes selection with the smallest bearings variances.

The Jacobian $H_{n+1}^{PT}[k]$ are extended in the same as (53) which two virtual sensors are measuring two bearings. In general, the Jacobian of measurement function in p with K sensors are expressed as $$H_n^{PT}[k] = [\nabla x_{n+1}^P [h_{n+1}^{P(1)}(X_{n+1}^P) h_{n+1}^{P(2)}(X_{n+1}^P) \ldots h_{n+1}^{P(R)}(X_{n+1}^P)]]^T \quad (57)$$

As an example, in an x-y plane, it is expressed as $$\begin{pmatrix} \frac{\partial h^{(1)}}{\partial x_{n+1}} & \frac{\partial h^{(1)}}{\partial Vx_{n+1}} & \frac{\partial h^{(1)}}{\partial y_{n+1}} & \frac{\partial h^{(1)}}{\partial Vy_{n+1}} \\ \frac{\partial h^{(2)}}{\partial x_{n+1}} & \frac{\partial h^{(2)}}{\partial Vx_{n+1}} & \frac{\partial h^{(2)}}{\partial y_{n+1}} & \frac{\partial h^{(2)}}{\partial Vy_{n+1}} \\ \vdots & \vdots & \vdots & \vdots \\ \frac{\partial h^{(R)}}{\partial x_{n+1}} & \frac{\partial h^{(R)}}{\partial Vx_{n+1}} & \frac{\partial h^{(R)}}{\partial y_{n+1}} & \frac{\partial h^{(R)}}{\partial Vy_{n+1}} \end{pmatrix} \quad (58)$$

Next, there will be described CRLB analysis on a direct 3-D method using multiple sensors.

Similarly to single sensor based direct 3-D method, the information matrix $J_n$ is 6×6 matrix. The low bound is $$J_{n+1}[k] = [F_n^{-1}[k]]^T J_n[k] F_n^{-1}[k] + H_{n+1}^T[k] H_{n+1}^{-1}[k] H_{n+1}[k] \quad (59)$$

The dynamic model $F_n[k]$ is transformed with respect to each sensor position.

Based on bearings $\theta 1$, $\phi 1$, $\theta 2$, $\phi 2$, $\theta K$ and $\phi K$ from K multiple sensors, the augmented bearings measurement vector is denoted as $[\theta 1 \, \phi 1 \, \theta 2 \, \phi 2 \, \ldots \, \theta K \, \phi K]^T$ extending the equations of $R_n$ and $H_n$ in (53) and (54) which are derived by $$R_n = \begin{pmatrix} \sigma_{\theta 1} & 0 & 0 & 0 & 0 & 0 & 0 \\ 0 & \sigma_{\phi 1} & 0 & 0 & 0 & 0 & 0 \\ 0 & 0 & \sigma_{\theta 2} & 0 & 0 & 0 & 0 \\ 0 & 0 & 0 & \sigma_{\phi 2} & 0 & 0 & 0 \\ \vdots & \vdots & \vdots & \vdots & \ddots & \vdots & \vdots \\ 0 & 0 & 0 & 0 & 0 & \sigma_{\theta R} & 0 \\ 0 & 0 & 0 & 0 & 0 & 0 & \sigma_{\phi R} \end{pmatrix} \quad (40)$$

$$H_n^T[k] = [\nabla x_{n+1} [h_{n+1}^{(1)}(X_{n+1}) h_{n+1}^{(2)}(X_{n+1}) \ldots h_{n+1}^{(R)}(X_{n+1})]]^T \quad (61)$$

$$= \begin{pmatrix} \frac{\partial h^{(1)}}{\partial x_{n+1}} & \frac{\partial h^{(1)}}{\partial Vx_{n+1}} & \frac{\partial h^{(1)}}{\partial y_{n+1}} & \frac{\partial h^{(1)}}{\partial Vy_{n+1}} & \frac{\partial h^{(1)}}{\partial z_{n+1}} & \frac{\partial h^{(1)}}{\partial Vz_{n+1}} \\ \frac{\partial h^{(2)}}{\partial x_{n+1}} & \frac{\partial h^{(2)}}{\partial Vx_{n+1}} & \frac{\partial h^{(2)}}{\partial y_{n+1}} & \frac{\partial h^{(2)}}{\partial Vy_{n+1}} & \frac{\partial h^{(2)}}{\partial z_{n+1}} & \frac{\partial h^{(2)}}{\partial Vz_{n+1}} \\ \vdots & \vdots & \vdots & \vdots & \vdots & \vdots \\ \frac{\partial h^{(R)}}{\partial x_{n+1}} & \frac{\partial h^{(R)}}{\partial Vx_{n+1}} & \frac{\partial h^{(R)}}{\partial y_{n+1}} & \frac{\partial h^{(R)}}{\partial Vy_{n+1}} & \frac{\partial h^{(R)}}{\partial z_{n+1}} & \frac{\partial h^{(R)}}{\partial Vz_{n+1}} \end{pmatrix}.$$

In the above, the embodiments of the present invention have been described. There will be described a simulation result and analysis on the same.

In this section, the performance of PPS method is demonstrated comparing with the direct 3-D method based on several scenarios. The scenarios 1 and 2 show the single sensor based planes selection according to φ. The scenario 3 shows the changing planes selection from x-y and y-z selected planes to x-y and y-z selected planes according to φ. The scenario 4 shows the multiple sensors based planes and sensors selection according to θ and φ.

Scenario 1: This scenario is that an object is moving in the range φ between 45o and 64o. Single sensor is placed in an origin (0, 0, 0). Initial position of an object is (1 m, 1 m, 3 m) with initial velocity (1 m=s, 1 m=s, 1 m=s). A sensor is measuring two measured angles θ and φ at the interval 0.1 second with measured variance 3 both. The observed object is moving CV in x direction, CA in y and z direction, 0.1 m/s² and 0.5 m/s², respectively. Since the φ is in the range between 45° and 64°, x-y and y-z planes are selected.

Scenario 2: This scenario is that an object is moving in the range φ between 24° and 32°. Similarly to the scenario 1, single sensor is placed in an origin (0, 0, 0) with same initial velocity and movement; CV in x direction, CA in y and z direction, 0.1 m/s² and 0.5 m/s², respectively. Initial position of an object is (2 m, 1 m, 1 m). Since the φ is in the range between 24° and 32°, x-y and z-x planes are selected.

3) Scenario 3: This scenario is that an object is moving in the range φ between 40° and 48° crossing 45°. Similarly to the scenarios 1 and 2, a single sensor is placed in an origin (0, 0, 0) with same initial velocity and movement; CV in x direction, CA in y and z direction, 1 m/s² and 0.5 m/s², respectively. Initial position of an object is (2 m, 1 m, 2.5 m). Since the φ of the first 13 time-instants is in the range between 45o and 48o, x-y and y-z planes are selected. In the last 37 time-instants, x-y and z-x planes are selected since the φ is the range between 45° and 48°.

Figure 14:
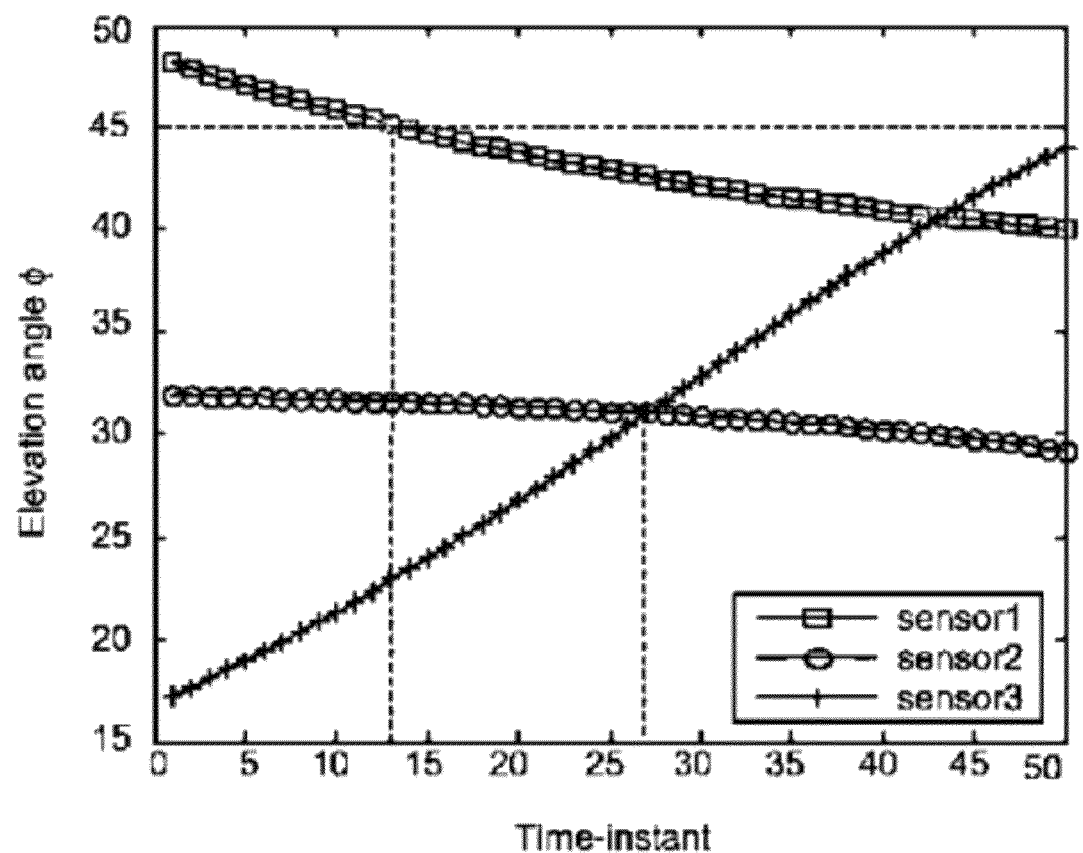
FIG. 14 illustrates performance of multiple sensors using two optimized planes selected in IMS.

Scenario 4: This scenario is that an object is moving as same as the scenario 3. Here, three multiple sensors are placed in (0, 0, 0) called sensor 1, (10, 0, 0) called sensor 2, and (10, 10, 10) called sensor 3. The measured angle φ is different as shown in FIG. 14. Based on PPS method, scheduling presented in Section IV-B is possible through the multiple sensors. We show the multiple sensor performance using the two best selected planes of IMS only since other multiple sensors algorithms focus on fusion strategy through nodes association. During the first 13 time-instants, y-z planes from sensor 1 and z-x planes from sensor 3 are selected. After time-instant 13, φ of all three sensors leads to select a z-x plane. Hence, from time-instants 14 to 27, z-x plane from sensor 3 is selected where the φ of sensor is close to 0 resulting in small measurement variance. In addition, one more selection is any x-y plane which is insensitive to the projection. Finally from time-instants 28 to 50, z-x plane from sensor 2 is selected with any x-y plane. Note that the planes selection is based on the projected variance characteristic illustrated in FIGS. 2 and 3.

Figure 15A:
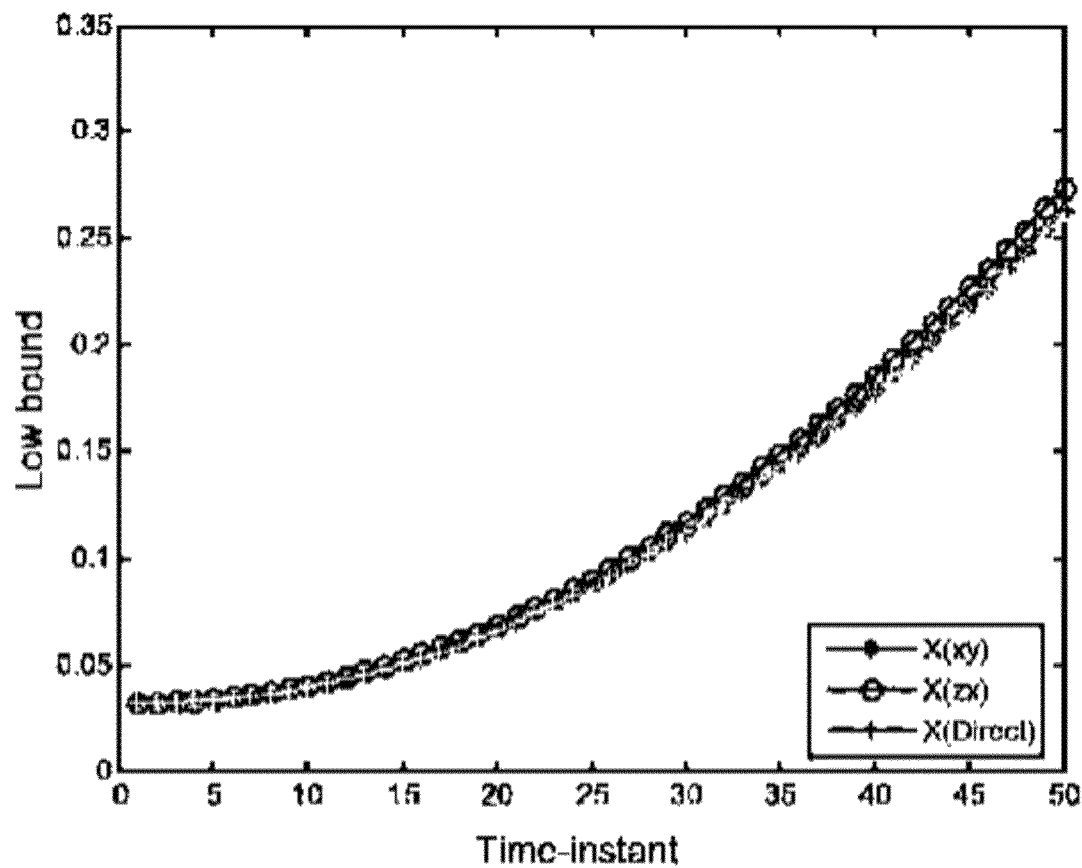
FIGS. 15(a)-(c) and 16(a)-(c) illustrate low bounds in every direction, respectively.
Figure 15B:
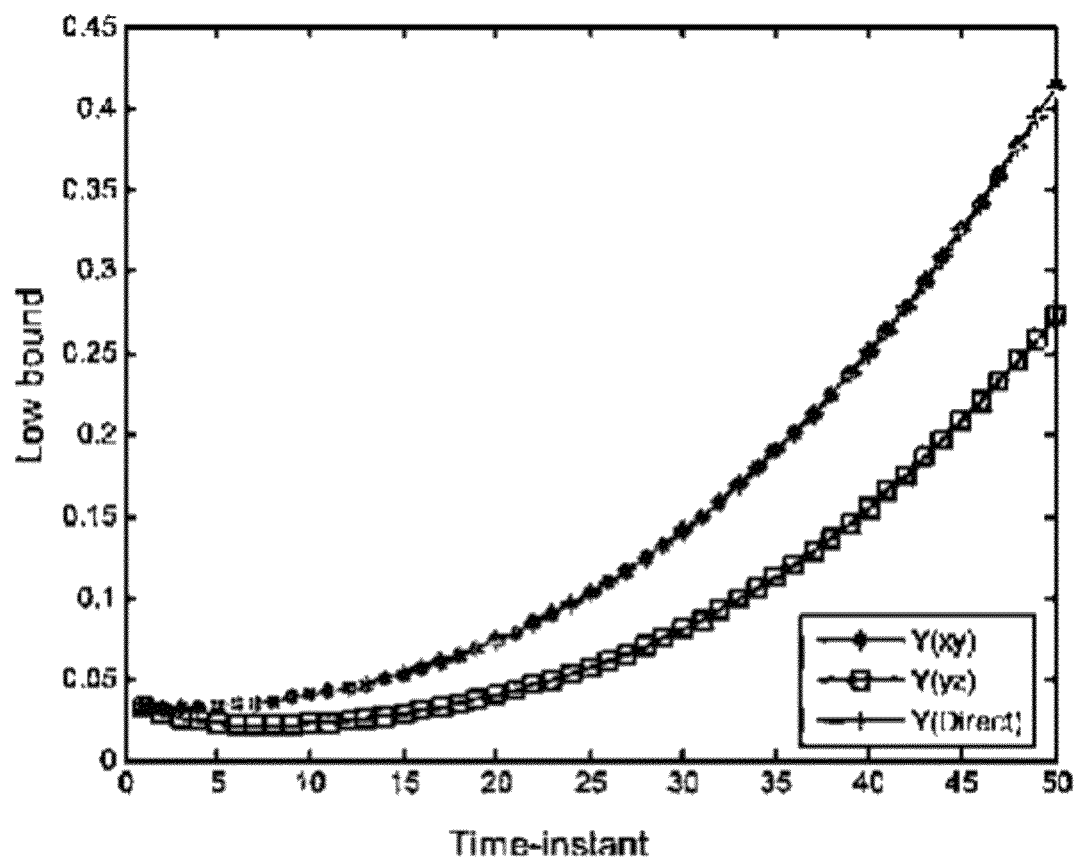
Figure 15C:
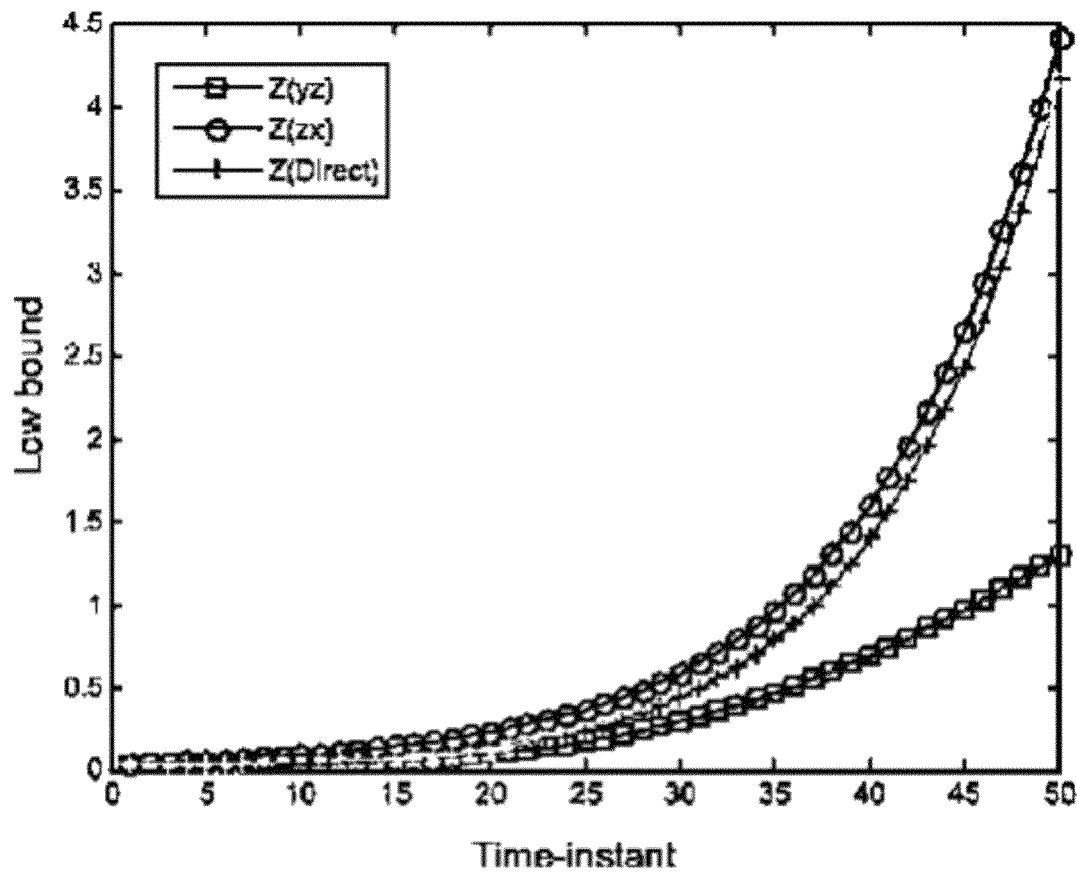
Figure 16A:
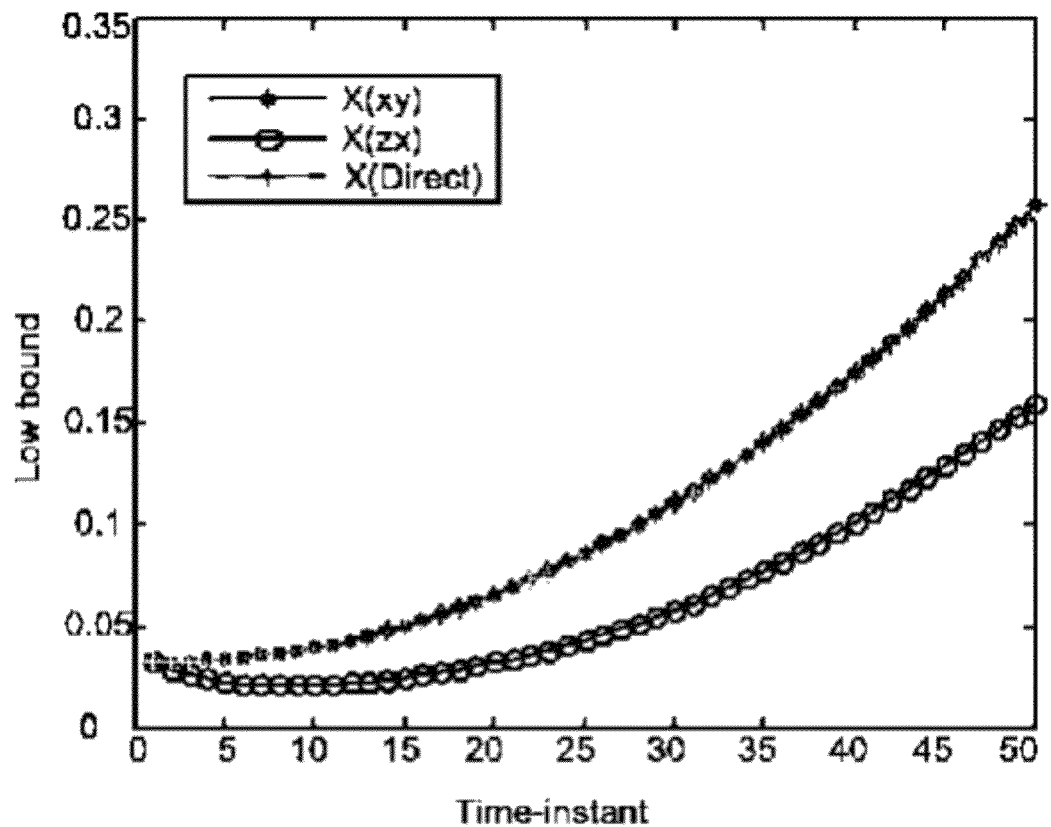
Figure 16B:
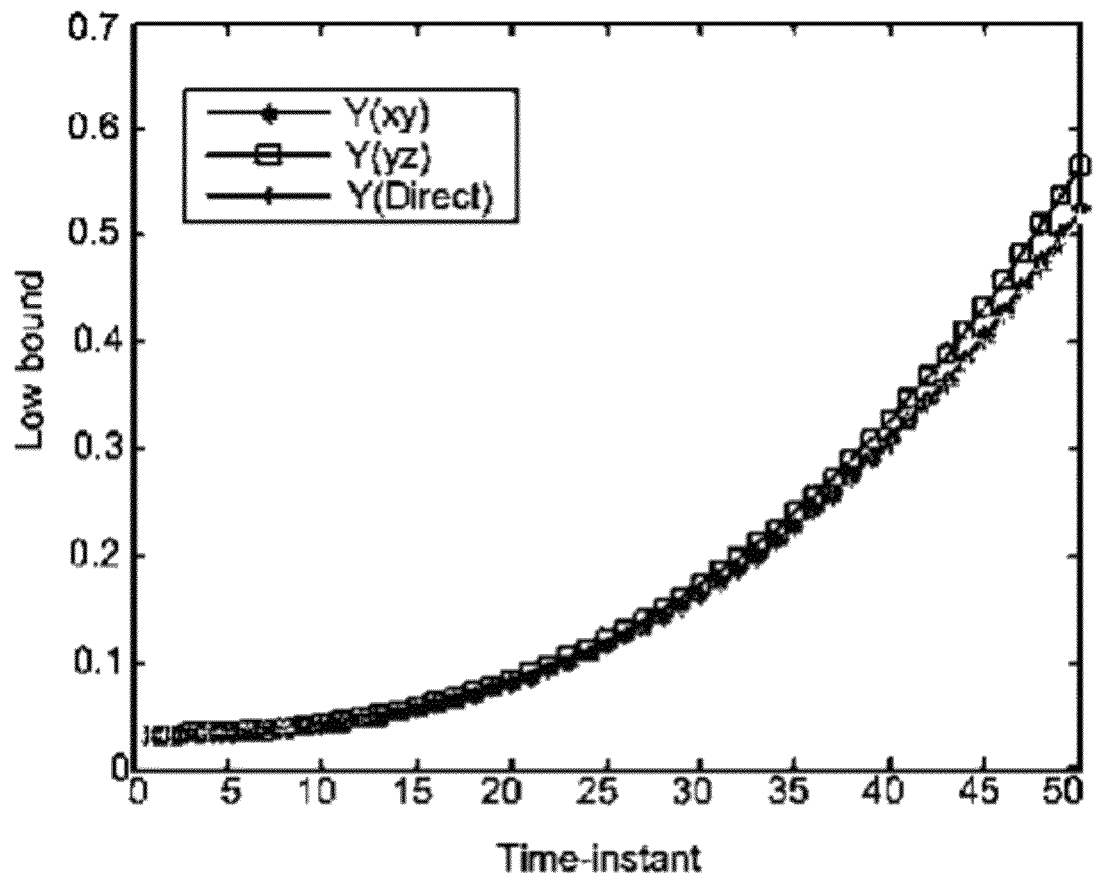
Figure 16C:
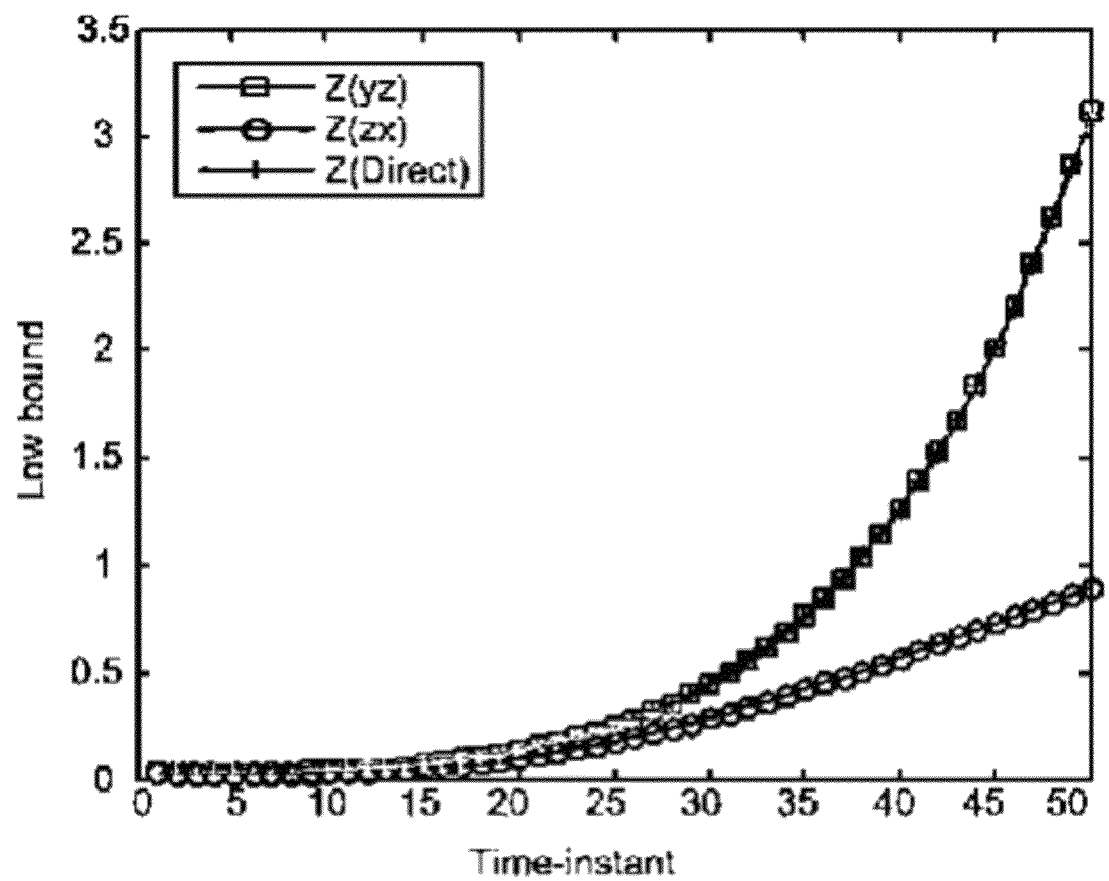
Figure 17A:
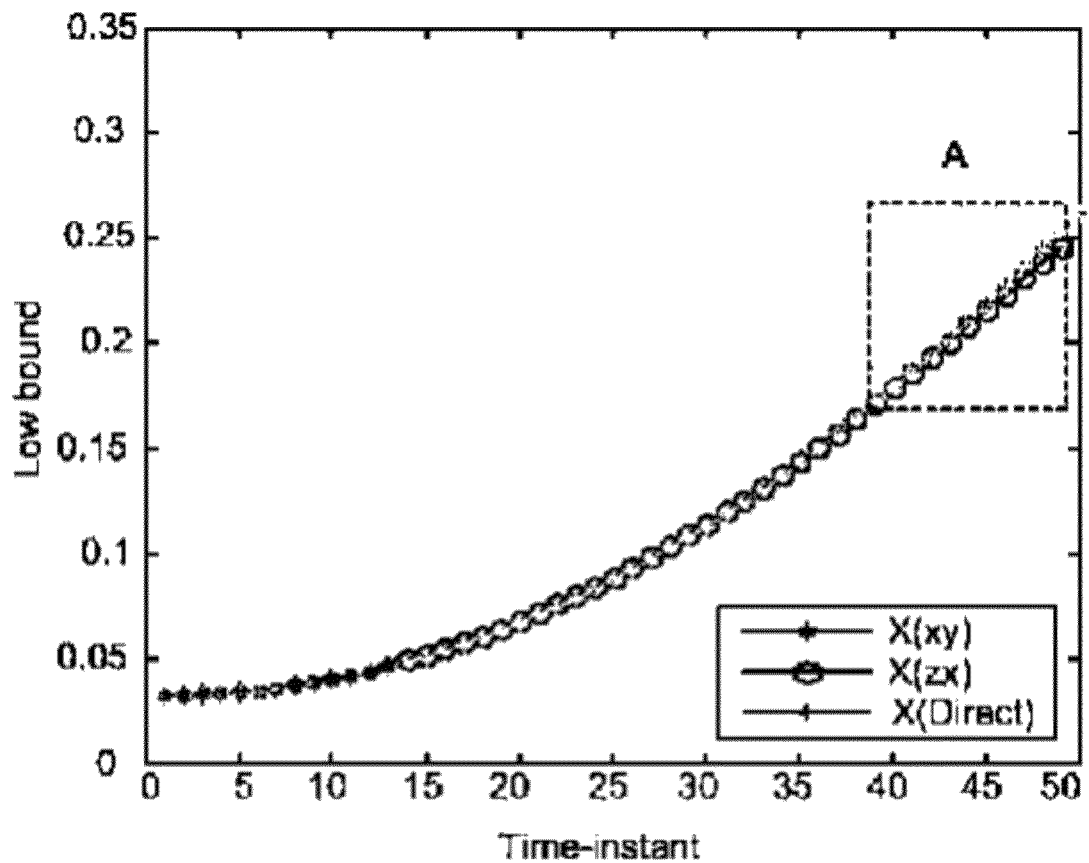
FIGS. 17(a)-(f) and 18(a)-(c) illustrate cases of using one sensor and using multiple sensors, respectively.
Figure 17B:
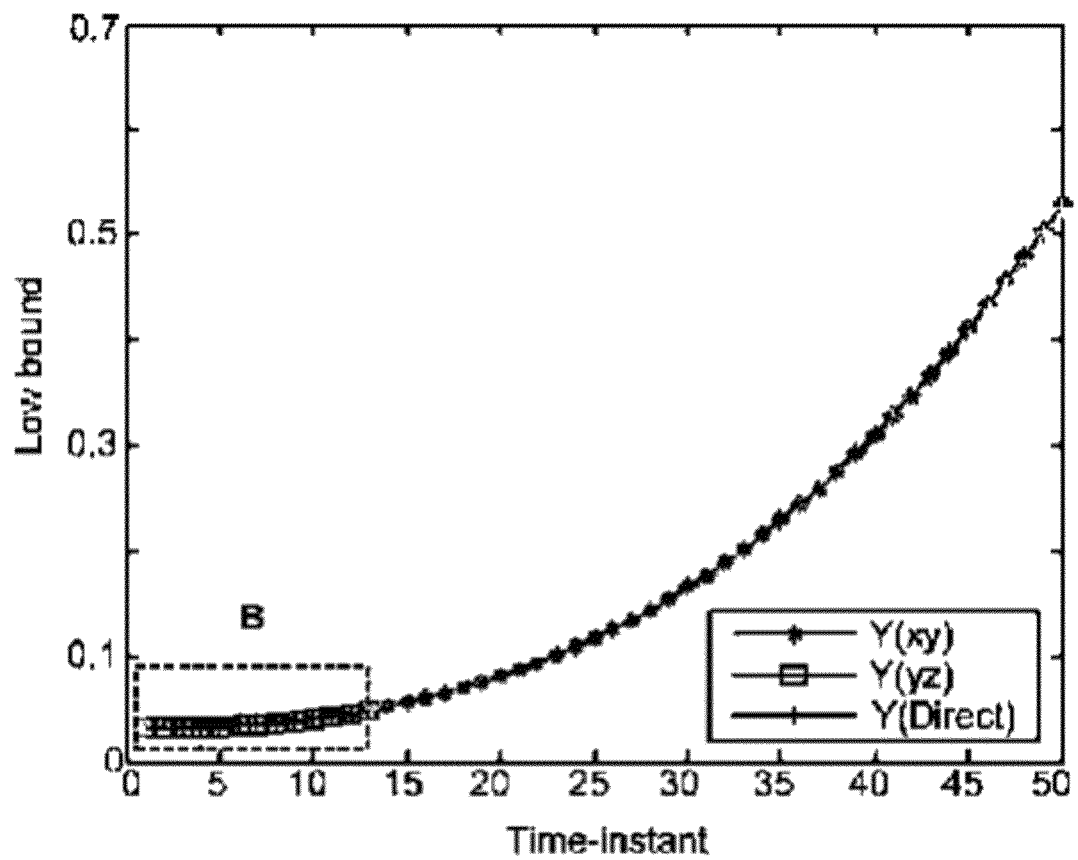
Figure 17C:
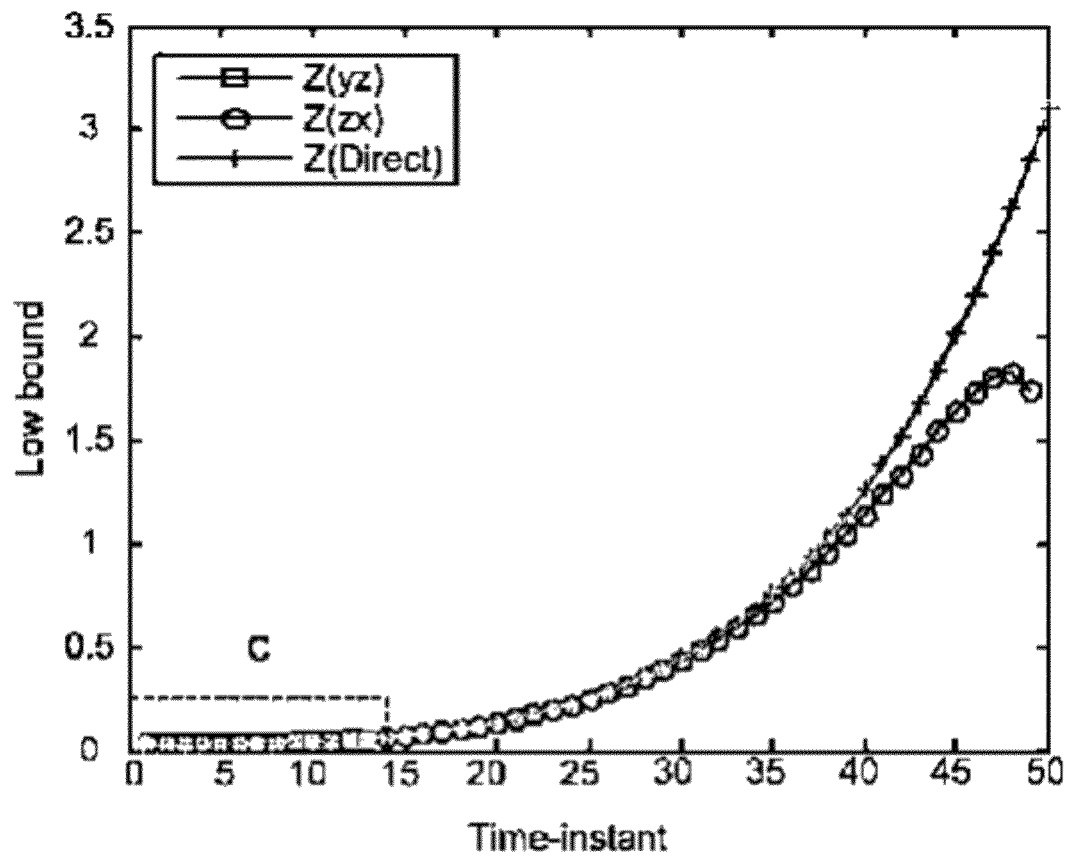
Figure 17D:
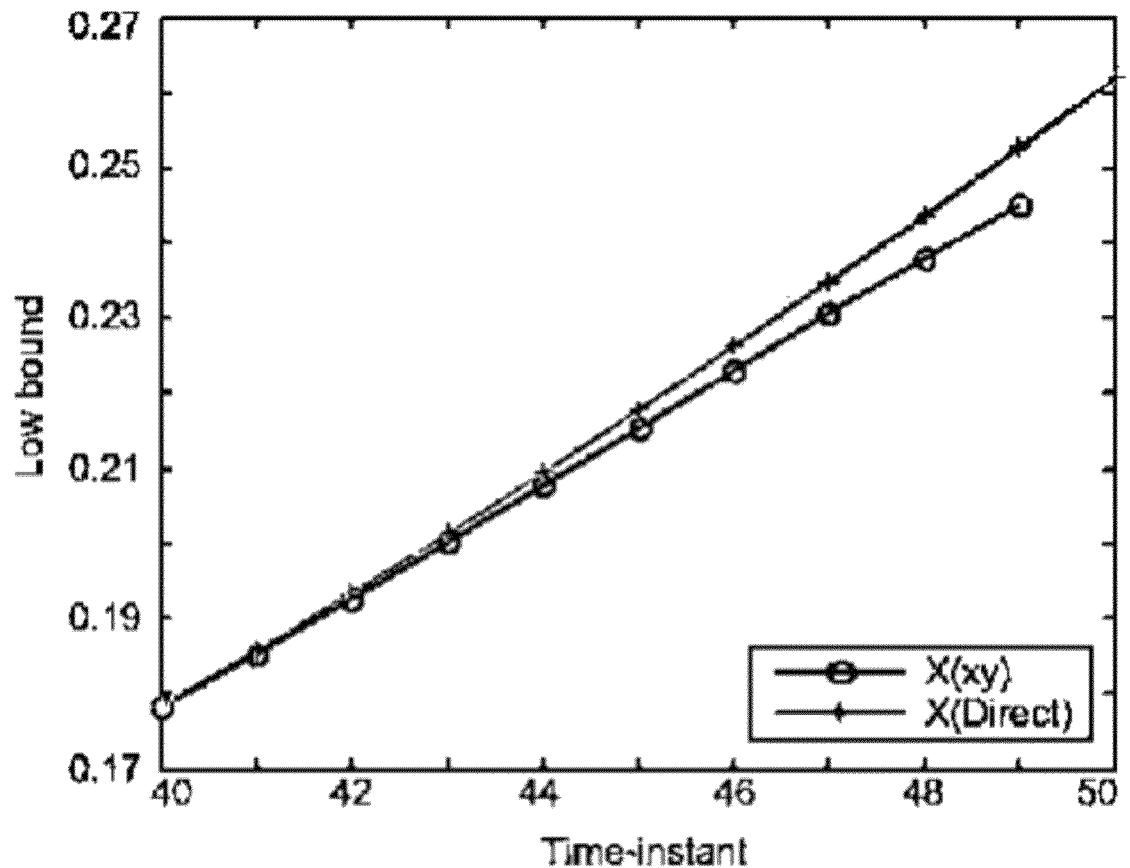
Figure 17E:
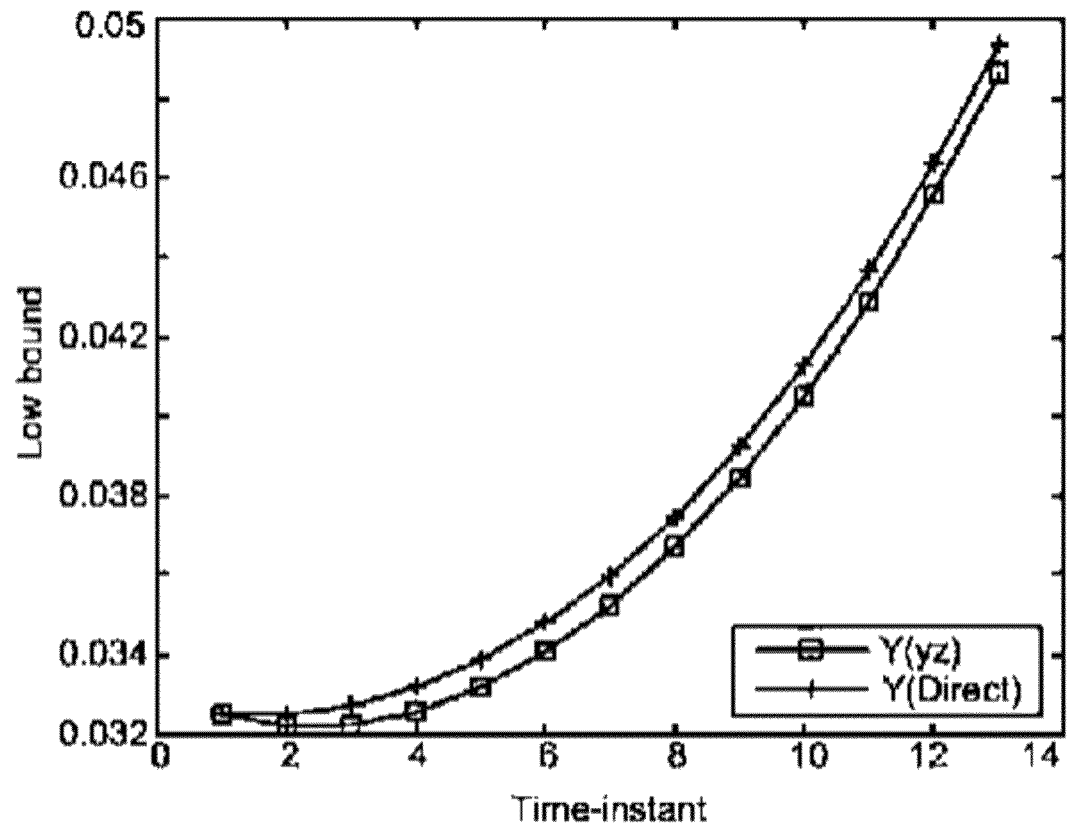
Figure 17F:
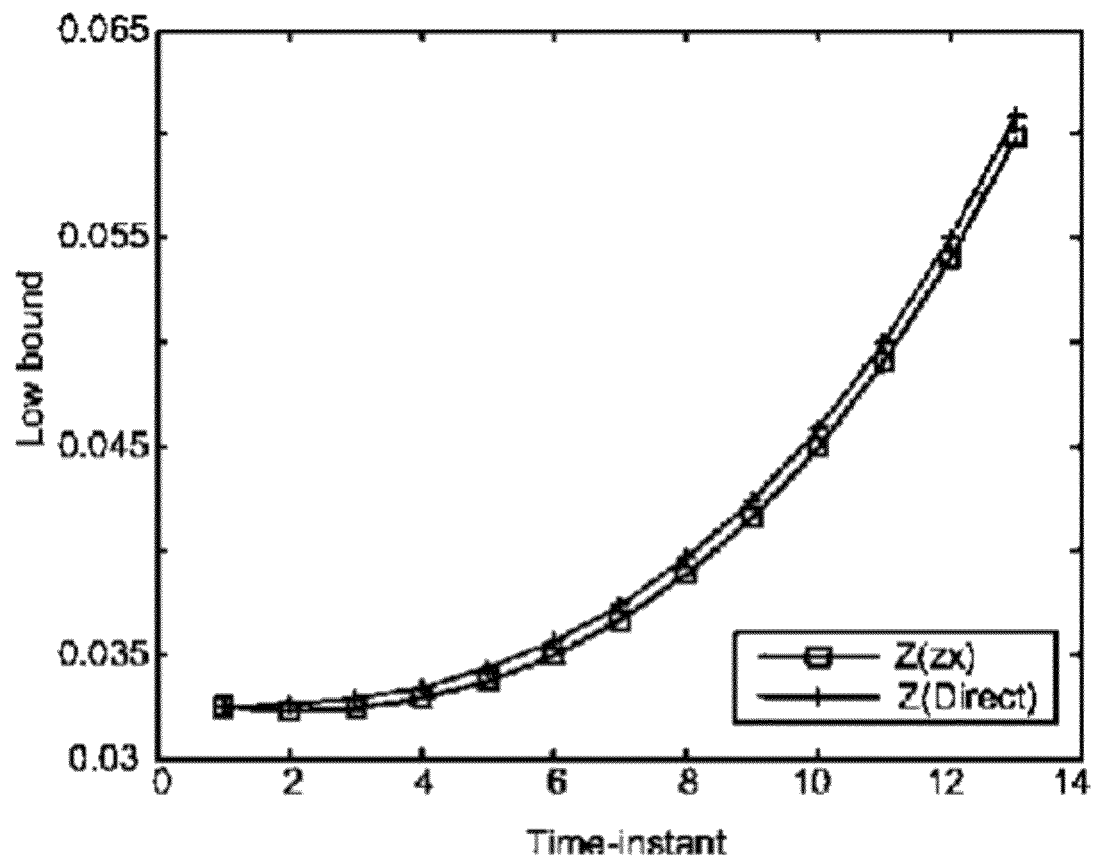
Figure 18A:
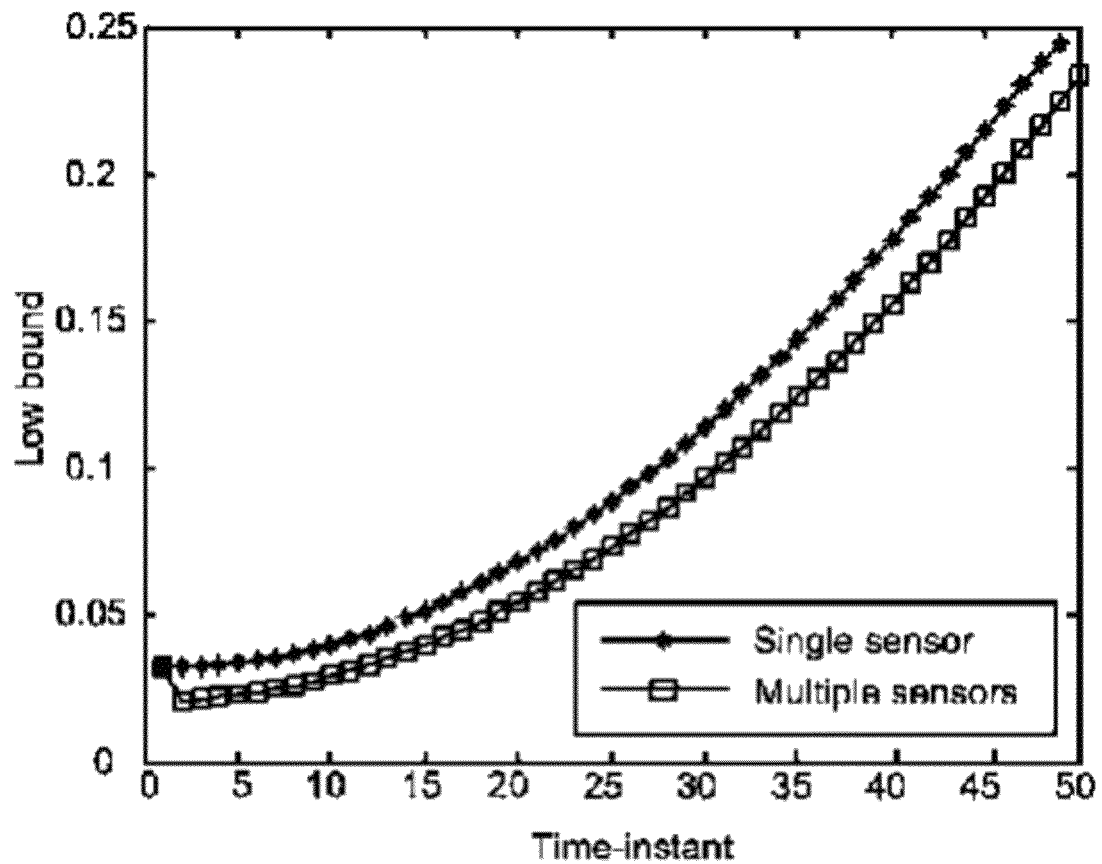
Figure 18B:
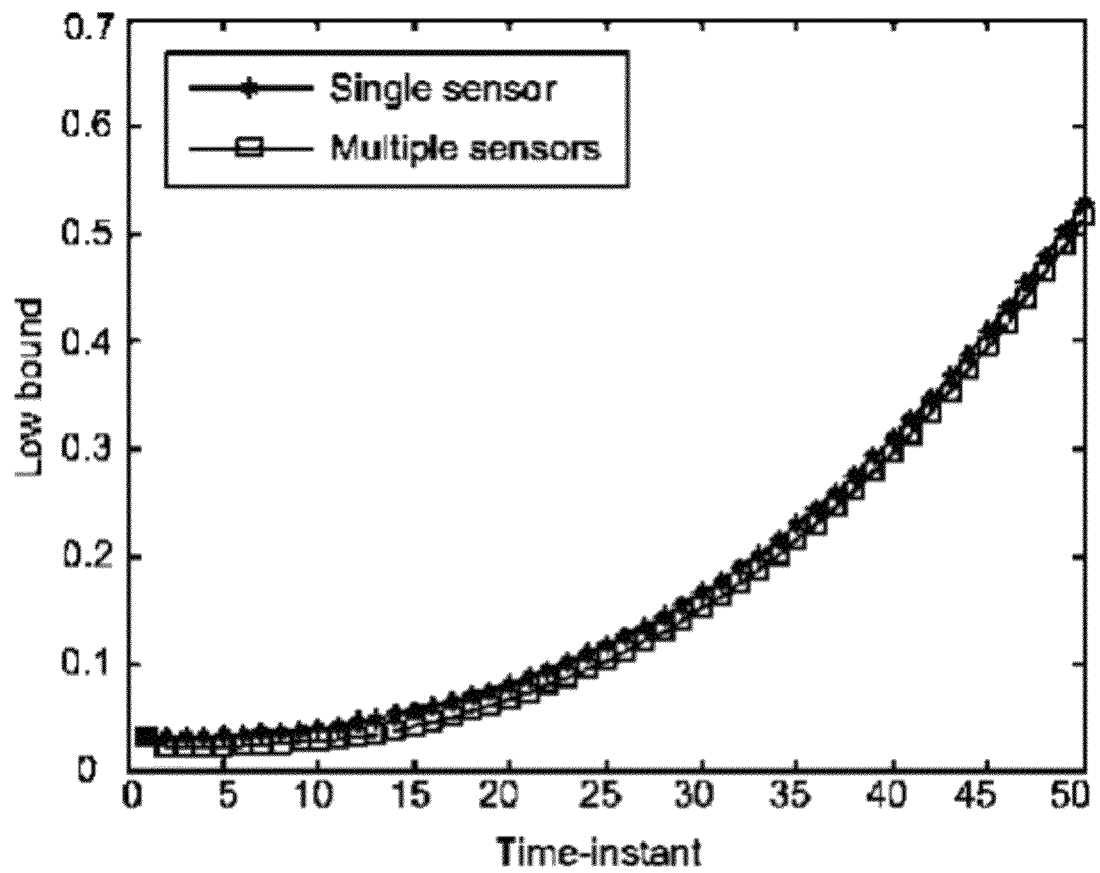
Figure 18C:
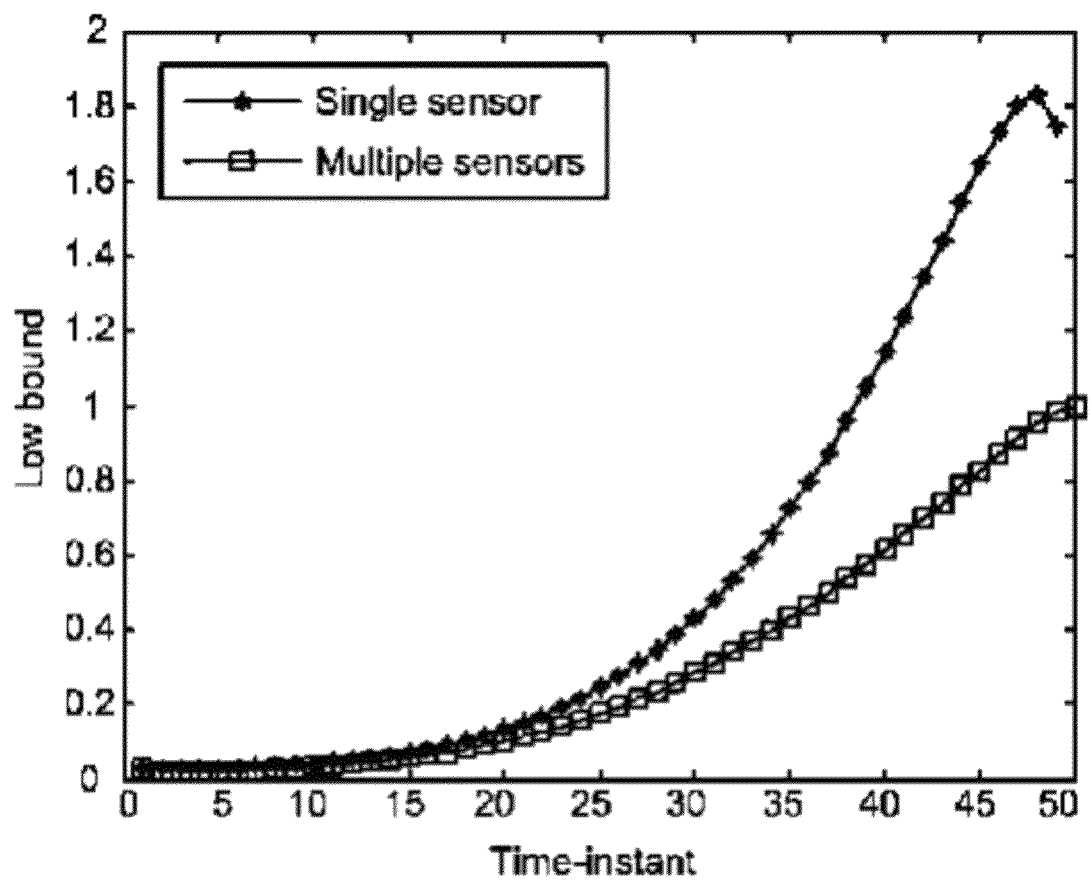

FIGS. 15 and 16 represent the low bound in each direction. In FIG. 15, the selection of y-z plane with x-y plane, in FIG. 16, the selection of z-x plane with x-y plane shows the good performance which proves the PPS method is a good estimator. Note that all boundaries are presented for the comparison of other planes selection. In addition, single sensor and multiple sensor based estimations are compared in FIGS. 17 and 18 which have the same scenario except for the number of sensors. In particular, the multiple sensor based estimation is using the scheduling method finding the best two planes among three sensors. Since the multiple sensors support broader choices for planes selection, the performance is shown to be better comparing single sensor based estimation.

As described above, exemplary embodiments have been shown and described. Though specific terms are used herein, they are just used for describing the present invention but do not limit the meanings and the scope of the present invention disclosed in the claims. Therefore, it would be appreciated by those skilled in the art that changes may be made to these embodiments without departing from the principles and spirit of the invention. Accordingly, the technical scope of the present invention is defined by the claims and their equivalents.

INDUSTRIAL APPLICABILITY

The present invention may be applied to the field of 3-D object tracking.

The invention claimed is:

1. A method of tracking an object in a three-dimensional (3-D) space by using particle filter-based acoustic sensors, the method comprising:
    placing one or more particle filter-based acoustic sensors generating planes in a 3-D space;
    selecting two planes from the planes generated by the one or more particle filter-based acoustic sensors;
    executing two-dimensional (2-D) particle filtering on the two selected planes, respectively; and
    associating results of the 2-D particle filtering on the respective planes, whereby tracking the object.

2. The method of claim 1, wherein the method uses a single particle filter-based acoustic sensor.

3. The method of claim 2, wherein the two selected planes are determined based an elevation of three planes in the 3-D space with respect to the single particle filter-based acoustic sensor.

4. The method of claim 1, wherein the method uses a plurality of particle filter-based acoustic sensors.

5. The method of claim 4, wherein the two selected planes are determined based on an azimuth and an elevation of the planes in the 3-D space with respect to the plurality of particle filter-based acoustic sensors.

6. The method of claim 4, wherein the selecting two planes is executed by using independent k-multiple particle filter-based acoustic sensors.

7. The method of claim 4, wherein the selecting two planes is executed by using common-resampling k-multiple particle filter-based acoustic sensors.

8. The method of claim 4, wherein the selecting two planes is executed by using merged k-multiple particle filter-based acoustic sensors.

9. The method of claim of 1, wherein the associating results of the 2-D particle filtering on the respective planes is performed regarding weights as the same with respect to the same factors in two different planes.

10. The method of claim 1, wherein the associating results of the 2-D particle filtering on the respective planes is performed by adding a weight of each of the same factors in two different planes to each other.

* * * * *